| (12) | United States Patent<br>Yanai et al. | (10) Patent No.: US 9,395,821 B2<br>(45) Date of Patent: Jul. 19, 2016 |
|---|---|---|

(54) SYSTEMS AND TECHNIQUES FOR USER INTERFACE CONTROL

(71) Applicant: Intel Corporation, Santa Clara, CA (US)

(72) Inventors: Yaron Yanai, Modiin (IL); Eli Elhadad, Kidron (IL); Amir Rosenberger, Ness Ziona (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/405,731

(22) PCT Filed: Mar. 27, 2014

(86) PCT No.: PCT/US2014/032082
§ 371 (c)(1),
(2) Date: Dec. 4, 2014

(87) PCT Pub. No.: WO2015/102658
PCT Pub. Date: Jul. 9, 2015

(65) Prior Publication Data
US 2015/0324001 A1 Nov. 12, 2015

Related U.S. Application Data

(60) Provisional application No. 61/923,595, filed on Jan. 3, 2014.

(51) Int. Cl.
| G06F 3/01 | (2006.01) |
| G06K 9/00 | (2006.01) |
| G06T 7/00 | (2006.01) |
| G06F 3/03 | (2006.01) |

(52) U.S. Cl.
CPC ............. *G06F 3/017* (2013.01); *G06F 3/011* (2013.01); *G06F 3/0304* (2013.01); *G06K 9/00355* (2013.01); *G06T 7/004* (2013.01)

(58) Field of Classification Search
CPC .......... G06F 3/017; G06F 3/005; G06F 3/01; G06F 3/042; G06F 3/04842; G06F 3/011; G06F 3/0346; G06F 4/014; G06T 19/00; G01L 23/10; G01L 9/008
See application file for complete search history.

(56) References Cited

U.S. PATENT DOCUMENTS

| 7,227,526 B2 * | 6/2007 | Hildreth | G06T 19/006 345/156 |
| 8,405,717 B2 * | 3/2013 | Kim | G06T 7/0018 348/135 |
| 2008/0071507 A1 * | 3/2008 | Hodgins | G01S 5/16 703/6 |
| 2008/0098328 A1 * | 4/2008 | Rollin | G06F 3/04817 715/810 |

(Continued)

OTHER PUBLICATIONS

International Search Report and Written Opinion mailed Oct. 2, 2014 for International Application No. PCT/US2014/032082, 12 pages.

*Primary Examiner* — Sanjiv D Patel
(74) *Attorney, Agent, or Firm* — Schwabe, Williamson & Wyatt, P.C.

(57) ABSTRACT

Embodiments of systems and techniques for user interface (UI) control are disclosed herein. In some embodiments, a UI control system may determine locations of landmarks on a body of a user of a computing system, determine a pointer based at least in part on the landmark locations, and identify a UI element of an UI of the computing system based at least in part on the pointer. Other embodiments may be described and/or claimed.

17 Claims, 14 Drawing Sheets

(56) References Cited

U.S. PATENT DOCUMENTS

| | | | |
|---|---|---|---|
| 2009/0183125 A1* | 7/2009 | Magal | G06F 3/017 715/863 |
| 2010/0079466 A1* | 4/2010 | Griffin | G06K 9/00335 345/473 |
| 2010/0125812 A1* | 5/2010 | Hartman | G02B 27/01 715/848 |
| 2010/0194879 A1* | 8/2010 | Pasveer | A61B 5/1127 348/135 |
| 2012/0105315 A1* | 5/2012 | Wilson | G06F 3/017 345/156 |
| 2012/0117514 A1* | 5/2012 | Kim | G06F 3/011 715/849 |
| 2013/0249793 A1 | 9/2013 | Zhu et al. | |
| 2013/0307765 A1* | 11/2013 | Li | G06F 3/017 345/156 |
| 2013/0321279 A1 | 12/2013 | Engle | |
| 2013/0342459 A1 | 12/2013 | Karakotsios et al. | |
| 2015/0052481 A1* | 2/2015 | Ronkainen | G06F 3/0416 715/815 |
| 2015/0062161 A1* | 3/2015 | Kim | G06T 19/006 345/633 |
| 2015/0227222 A1* | 8/2015 | Sako | G06F 3/011 345/173 |

* cited by examiner

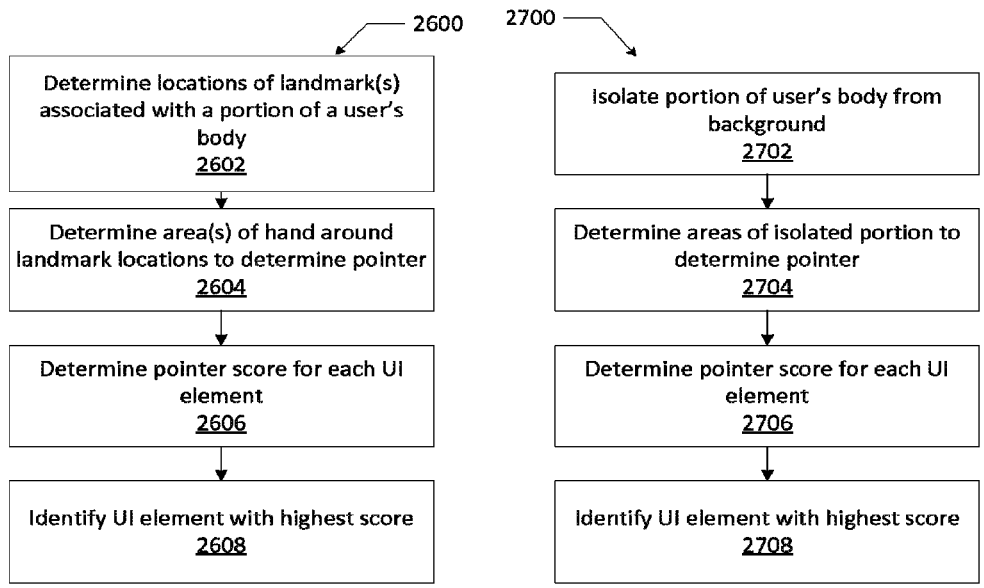
FIG. 26
FIG. 27
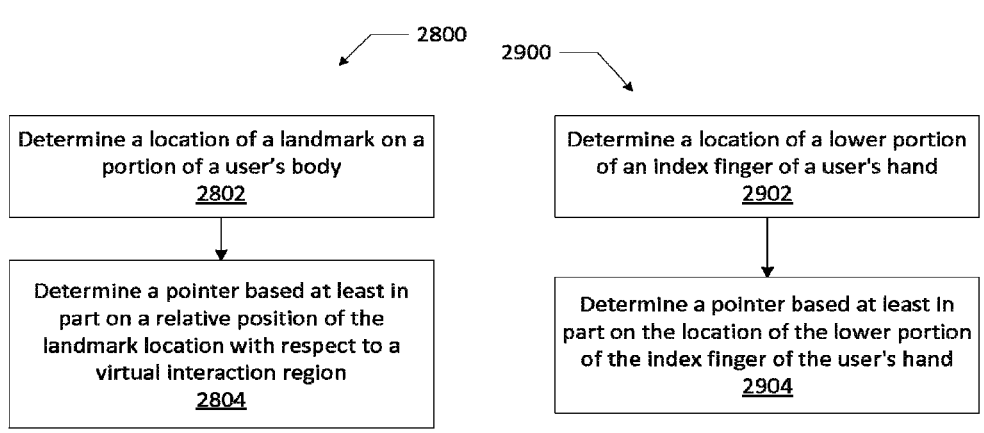
FIG. 28
FIG. 29

SYSTEMS AND TECHNIQUES FOR USER INTERFACE CONTROL

CROSS REFERENCE TO RELATED APPLICATION

The present application is a national phase entry under 35 U.S.C. §371 of International Application No. PCT/US2014/032082, filed May 27, 2014, entitled "SYSTEMS AND TECHNIQUES FOR USER INTERFACE CONTROL," which designated, among the various States, the United States of America, and which claims priority to U.S. Provisional Patent Application No. 61/923,595, filed Jan. 3, 2014, entitled "SYSTEMS AND TECHNIQUES FOR USER INTERFACE CONTROL." The specifications of PCT/US2014/032082 and 61/923,595 are hereby incorporated by reference.

TECHNICAL FIELD

The present disclosure relates generally to the field of user interfaces (UIs), and more particularly, to UI control.

BACKGROUND

Conventional input devices for computing systems constrain the range of possible inputs that a user can provide and often require that a user learn and use artificial movements in order to effectively interact with the system. Gesture-based interfaces have been proposed, but suffer from limited flexibility, poor accuracy, and a high barrier to entry for inexperienced users.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 24-29 are flow diagrams of illustrative processes for UI control, in accordance with various embodiments.

DETAILED DESCRIPTION

Figure 1:
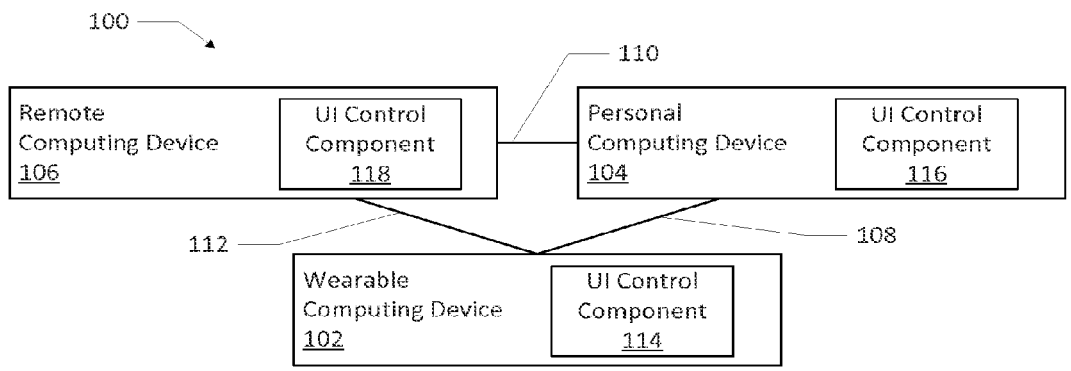
FIG. 1 is a block diagram of an illustrative computing system configured for user interface (UI) control, in accordance with various embodiments.

Embodiments of systems and techniques for user interface (UI) control are disclosed herein. For example, in some embodiments, a UI control system may determine locations of landmarks on a body of a user of a computing system (e.g., by tracking the location and movements of landmarks on a user's hands in three-dimensions), determine a pointer based at least in part on the landmark locations, and identify a UI element of a UI of the computing system based at least in part on the pointer. Identification and subsequent selection of the UI element may enable the user to control the computing system associated with the UI, for example, by mapping the locations of the user's movements to a display of the computing system, or by understanding specific gestures performed by the user. In some embodiments, a pointer based on landmark locations may be visually represented in the display (as is conventionally done with a mouse cursor) and the representation may change as the user interacts with UI elements in the display. In some embodiments, the systems and techniques disclosed herein may provide a user interaction mechanism (e.g., an "effective pointer") in which control of a virtual environment, such as a two-dimensional computer screen or a three-dimensional display, may be achieved by the free, natural movements of the user's hands, fingers and/or other portions of the user's body, while supporting the creation of complex user interface experiences.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware that provide the described functionality.

FIG. 1 depicts an illustrative computing system 100 configured for UI control, in accordance with various embodiments. In some embodiments, the computing system 100 may be configured to determine locations of one or more landmarks associated with a portion of a body of a user of the computing system, determine a pointer based at least in part on the landmark locations, and identify a UI element of a UI of the computing system based at least in part on the pointer. In various embodiments, the pointer may be a "multi-location" pointer based on a plurality of landmark locations, a "base" pointer based on a location of a lower portion of an index finger of a user's hand, or a "virtual" pointer based on a relative position of a landmark location with respect to a virtual interaction region, among other examples. The computing system 100 may include hardware configured to sense and interpret a user's movements (e.g., a three-dimensional camera and associated processing devices configured to perform tracking and gesture recognition techniques) and hardware to provide feedback to the user as to how he or she is influencing the computing system 100 through his or her actions (e.g., a monitor or other display device).

The computing system 100 may include a wearable computing device 102, a personal computing device 104 and a remote computing device 106. Each of the wearable computing device 102, the personal computing device 104 and the remote computing device 106 may include UI control components (illustrated in FIG. 1 as UI control components 114, 116 and 118, respectively). UI control operations may be distributed between the UI control components 114, 116 and 118 of the computing system 100 as suitable. Several examples of the distribution of operations between the components of the computing system 100 are discussed herein, but any other combination of more or less components and distribution of the operations may be used. In some embodiments, the computing system 100 may be configured as the UI control system 200, discussed below with reference to FIG. 2.

Communication within the computing system 100 may be enabled by the communication pathways 108, 110 and 112. The communication pathways 108, 110 and 112 may each include wired communication pathways and/or wireless communication pathways, over direct couplings, and/or over personal, local and/or wide area networks. Each of the wearable computing device 102, the personal computing device 104 and the remote computing device 106 may include suitable hardware for supporting the communication pathways 108, 110 and 112, such as network interface cards, modems, WiFi devices, Bluetooth devices, and so forth. In some embodiments, the communication pathways 108, 110 and 112 may be direct communication pathways between the components as illustrated in FIG. 1. As used herein, references to "direct" communication pathways between two components of the computing system 100 of FIG. 1 (or any system or device disclosed herein) may refer to a communication pathway that does not route through another illustrated component, but that may route through other non-illustrated devices (e.g., routers and/or switches).

Each of the computing devices included in the computing system 100 may include a processing device and a storage device (not shown). The processing device may include one or more processing devices, such as one or more processing cores, ASICs, electronic circuits, processors (shared, dedicated, or group), combinational logic circuits, and/or other suitable components that may be configured to process electronic data. The storage device may include any suitable memory or mass storage devices (such as solid-state drive, diskette, hard drive, compact disc read only memory (CD-ROM) and so forth). Each of the computing devices included in the computing system 100 may include one or more buses (and bus bridges, if suitable) to communicatively couple the processing device, the storage device, and any other devices including in the respective computing devices. The storage device may include a set of computational logic, which may include one or more copies of computer readable media having instructions stored therein which, when executed by the processing device of the computing device, may cause the computing device to implement any of the techniques and methods disclosed herein, or any portion thereof. The wearable computing device 102, the personal computing device 104 and the remote computing device 106 may each include peripheral devices, which may communicate via wired or wireless communication pathways, such as cameras, printers, scanners, radio frequency identification (RFID) readers, credit card swipe devices, or any other peripheral devices. Except for the UI control teachings of the present disclosure incorporated therein, the wearable computing device 102, the personal computing device 104 and the remote computing device 106 may be a broad range of such devices known in the art. Specific, but not limiting, examples are described below. In some embodiments, the computational logic may include any of the logic discussed below with reference to FIG. 2.

The wearable computing device 102 may be a computing device that is integrated into a garment, accessory or other support structure that is configured to be worn on the body of the user (or "wearer"). Examples of suitable support structures for the wearable computing device 102 may include glasses, a headset, a hair accessory (e.g., a headband or barrette), an ear piece, jewelry (e.g., brooch, earrings or a necklace), a wrist band (e.g., a wristwatch), a neck band (e.g., a tie or scarf), a garment (e.g., a shirt, pants, dress skirt or jacket), a hat, shoes, a lanyard or nametag, a contact lens, or an implantable support structure, among others. In some embodiments, the wearable computing device 102 may be a wrist-mounted computing device having a camera. In some embodiments, the wearable computing device 102 may be a glasses-mounted computing device having a camera. In some embodiments, the wearable computing device 102 may include one or more cameras (e.g., the image capture device 224, discussed below with reference to FIG. 2) which may capture gestures of the user's arms, hands and fingers and/or of the user's head, eyes or other portions of the body. In some embodiments, as discussed below with reference to FIG. 2, the wearable computing device 102 may include a wearable sensor, which may provide data representative of locations of one or more landmarks associated with a portion of a user's body.

The personal computing device 104 may be a computing device configured for carrying in a pocket, backpack or other carrying case, or configured to rest semi-permanently on a surface (e.g., as a server does in a rack or a desktop computer does on a desk). Examples of personal computing devices that may serve as the personal computing device 104 include cellular phones, smartphones, other personal mobile communication devices, tablets, electronic book readers, personal digital assistants, laptops, desktops or other such computing devices. User interface control and other operations performed by the personal computing device 104 may be controlled by an app or plug-in on the personal computing device 104, for example. In some embodiments, the personal computing device 104 may have more computing resources (e.g., processing power, memory, and/or communication bandwidth) than the wearable computing device 102. Thus, in some embodiments, data captured and preliminarily processed by the wearable computing device 102 (e.g., image or other sensor data representative of a location of a portion of the user's body) may be transmitted over the communication pathway 108 to the personal computing device 104 for further processing. In some embodiments, the personal computing device 104 may include one or more cameras (e.g., the image capture device 224, discussed below with reference to FIG. 2) which may capture gestures of the user's arms, hands and fingers and/or of the user's head, eyes or other portions of the body. One or more such cameras may be mounted on a display included in the personal computing device (e.g., above a touchscreen in a tablet device) or on another portion of the personal computing device 104.

The remote computing device 106 may include one or more servers (e.g., arranged in a "cloud" computing configuration) or other computing devices remote from the wearable computing device 102 and the personal computing device 104. The communication pathway 112 between the wearable computing device 102 and the remote computing device 106, and communication pathway 110 between the personal computing device 104 and the remote computing device 106, may be configured according to any remote wired or wireless communication protocol. In some embodiments, the remote computing device 106 may have more computing resources (e.g., processing power, memory, and/or communication bandwidth) than the wearable computing device 102 or the personal computing device 104. Thus, in some embodiments, data captured and preliminarily processed by the wearable computing device 102 and/or the personal computing device 104 (e.g., image or other sensor data representative of the location of a portion of the user's body) may be transmitted over the communication pathways 110 and/or 112 to the remote computing device 106 for further processing. In some embodiments, the remote computing device 106 may perform most of the UI control operations discussed below with reference to FIG. 2, including those performed by the landmark logic 204 and/or the selection logic 212. In some embodiments, the remote computing device 106 may include a memory storing data representative of past movements of a user that may be used to learn a user's particular movement patterns for training the control system 200 of FIG. 2 to recognize various gestures.

In some embodiments, the remote computing device 106 may communicate with a plurality of personal computing devices (configured similarly to the personal computing device 104) and/or a plurality of wearable computing devices (configured similarly to the wearable computing device 102). The remote computing device 106 may perform similar processing and storage operations for each personal or wearable computing device. For example, the remote computing device 106 may receive images of a portion of a user's body captured by image capture devices included in a plurality of personal or wearable computing devices (configured similarly to the personal computing device 104 or wearable computing device 102) and may perform UI control operations based on these images (e.g., identifying landmark locations). The remote computing device 106 may devote different resources to different ones of the plurality of personal or wearable computing devices in communication with the remote computing device (e.g., different memory partitions or databases for each device).

In some embodiments of the UI control systems disclosed herein, one or more of the components of the computing system 100 shown in FIG. 1 may not be included. For example, in some embodiments, the computing system 100 may not include a remote computing device 106. In some embodiments, the computing system 100 may not include a wearable computing device 102, and any image capture performed by the computing system 100 may be performed by an image capture device included in the personal computing device 104. In some embodiments, one or more of the communication pathways between components of the computing system 100 may not be included; for example, in some embodiments, the wearable computing device 102 may not communicate directly with the remote computing device 106 via the communication pathway 112 (but may communicate with the remote computing device 106 via the personal computing device 104 and the communication pathways 108 and 110). In some embodiments, both computing devices 102 and 104 may be wearable, or both computing devices 102 and 104 may be handheld.

Figure 2:
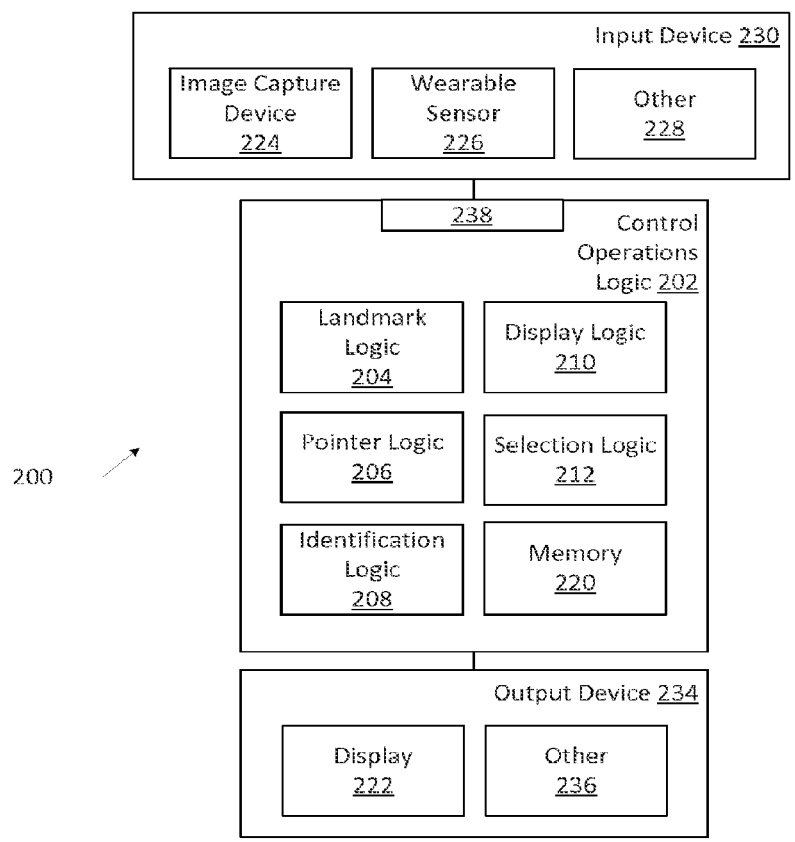
FIG. 2 is a block diagram of an illustrative UI control system that may be implemented by the computing system of FIG. 1, in accordance with various embodiments.

FIG. 2 depicts an illustrative UI control system 200, in accordance with various embodiments. As discussed above with reference to the computing system 100, the UI control system 200 may be configured to perform any of a number of UI control operations. For example, the UI control system 200 may be configured to determine locations of one or more landmarks associated with a portion of the user's body, determine a pointer based on the landmark locations, and identify a UI element based on the pointer. The UI control system 200 may be implemented by the computing system 100 of FIG. 1, in accordance with various embodiments. In particular, the components of the UI control system 200 may be distributed in any suitable manner among one or more of the components of the computing system 100. Although a number of components are illustrated in FIG. 2, various embodiments may omit components as appropriate for the UI control operations to be performed. For example, some embodiments of the UI control system 200 may not be configured for image information processing (and instead may use glove-based sensors or other input devices to determine landmark locations), and thus may not include the image capture device 224.

In some embodiments, the UI control system 200 may be configured to perform one or more gesture-recognition techniques, and thus enable a gesture-based interface. As used herein, "gesture recognition" may refer to identifying specific movements or pose configurations performed by a user. For example, gesture recognition may refer to identifying a swipe of a hand in a particular direction having a particular speed, a finger tracing a specific shape on a touch screen, or the wave of a hand. The UI control system 200 may accomplish gesture recognition by tracking the data representative of a position of a portion of a user's body (e.g., via the input device 230, which may include a depth camera), isolating the portion of the user's body from background data, identifying landmarks, such as the joints, of the user's hands and fingers (e.g., via the landmark logic 204), and then analyzing this tracked data to identify gestures performed by the user (e.g., using the pointer logic 206 and/or the selection logic 212). The systems and techniques disclosed herein may enable the UI control system 200 to comprehend the user's intended interactions with a UI by interpreting the movements of his or her body (e.g., his or her hands and fingers).

Gesture-based interfaces may allow a user to interact with an interface by navigating, selecting and manipulating the UI elements through the movements of his or her body. Gesture-based interfaces implemented by the UI control system 200 may rely on a mix of gesture recognition and tracking of a user's body. For example, the UI control system 200 may be configured to recognize a pinch gesture as an instruction to select an item, and tracking of the user's joints may be used for directly manipulating UI elements (e.g., by pointing, dragging, scaling and rotating).

Gesture-based interfaces may provide several advantages for a UI experience, and may support a more natural and intuitive interaction. Gesture-based interfaces may be fundamentally different from a conventional input device such as a touchscreen, mouse or keyboard. In particular, a user's body (e.g., a user's hands and fingers) may move freely in three-dimensional space, while user movements using conventional input devices may be constrained. Additionally, gesture-based interactions may lack the tactile feedback of physical input devices (e.g., the sensation of pressing a key on a keyboard or tapping a touchscreen surface). Consequently, gesture-based interfaces present unique challenges in creating successful, natural and readily adopted user experiences. A number of such challenges are addressed by the systems and techniques disclosed herein.

The UI control system 200 may include an input device 230. The input device 230 may include an image capture device 224, a wearable sensor 226, and/or other input devices 228. Although the input device 230 (and other components described herein) may be referred to in the singular, any number of input devices may be included in the input device 230 (and similarly, any component may include multiple such components). In some embodiments, the input device 230 may include a single input device (e.g., a single camera).

In some embodiments, the image capture device 224 may include one or more digital cameras, for example, and may use any imaging wavelength (e.g., visible or infrared light). As used herein, the term "camera" may include still image cameras and video cameras. In some embodiments, the image capture device 224 may capture video, such as high-definition video. In some embodiments, the image capture device 224 may be configured to stream image data (e.g., video data) to other devices via a wired or wireless communication pathway. For example, the image capture device 224 may be included in the wearable computing device 102 (FIG. 1), and may stream image data wirelessly to the personal computing device 104 via the communication pathway 108. In some embodiments, the image capture device 224 may be integral or peripheral to the personal computing device 104, and may provide streamed image data. In some embodiments, the image capture device 224 may include a visible light camera and an infrared camera, and may combine the images captured by these devices or treat them separately. In some embodiments, the image capture device 224 may include two or more cameras having different orientations (e.g., one camera that is mounted on, or otherwise associated with, the personal computing device 104 and faces the front of a user's body, and one camera that is mounted on the wearable computing device 102 and faces away from the user but may include the user's arms and hands as they gesture in front of the user). In some embodiments, the image capture device 224 may capture a sequence of successive images. These successive images may be captured at a rate of multiple frames per second, or faster or slower.

In some embodiments, the image capture device 224 may include a depth camera (which may also be referred to as a "three-dimensional camera"). Images produced by a depth camera may include depth data per pixel. The depth data for a pixel may be a value that represents the distance between an object in an imaged scene corresponding to the pixel, and the image capture device 224. A depth camera may include a depth image sensor, an optical lens, and an illumination source, among other components. The depth image sensor may rely on any of a number of different sensor technologies, such as time-of-flight (TOF) technology (e.g., scanning TOF or array TOF), structured light, laser speckle pattern technology, stereoscopic cameras, active stereoscopic sensors, and shape-from-shading technology, for example. Many depth camera sensor technologies include "active" sensors which supply their own illumination source. Other depth camera sensor technologies (e.g., stereoscopic cameras) may include "passive" sensors, which do not supply their own illumination source but depend instead on ambient environmental lighting. In addition to depth data, depth cameras may also generate color data, in the same way that conventional color cameras do, and this color data may be combined with the depth data during processing of depth camera images.

Depth cameras may have a number of advantages over conventional cameras (such as red-green-blue "RGB" cameras). For example, because depth cameras may provide distance information, foreground objects in a captured image may be more accurately and robustly distinguished from background objects, especially when such objects occlude one another. Image processing techniques using data camera images may also be more robust to changes in lighting conditions; some conventional RGB image processing techniques may incorrectly estimate the depth of objects in a captured image due to changes in lighting, when no change in the object's position or orientation has occurred. In particular, depth camera images may be advantageous for tracking the often complex articulations of the user's hands and fingers.

In some embodiments, the wearable sensor 226 may include a glove, bracelet, ring or other garment or jewelry worn on the hand and/or fingers, and may further include one or more sensors disposed in the garment or jewelry configured to generate data representative of a location of a user's fingers, palm, joints or other landmarks. Examples of such sensors may include accelerometers, whose data may be integrated once to generate velocity data and twice to generate location data. Other centers may be used instead of or in addition to accelerometers. Other portions of a user's body may be tracked, instead of or in addition to the user's arms, hands and/or fingers. For example, in some embodiments, the wearable sensor 226 may include a glasses-mounted sensor configured to generate data representative of a position of a user's head (indicating where the user's gaze is directed or sensing head movements such as nods, for example).

Examples of the other input devices 228 may include a keyboard, a cursor control device such as a mouse, a stylus, a touchpad, a bar code reader, a Quick Response (QR) code reader, an RFID reader, a Global Positioning System (GPS) receiver, a short-range wireless receiver (e.g., a Bluetooth receiver), an audio capture device (which may include one or more microphones arranged in various configurations), or any other suitable input device.

The UI control system 200 may include control operations logic 202. The control operations logic 202 may include an input device interface 238 configured to receive data from the input device 230, and logic components configured to analyze information provided by the input device 230 and output the results of the analysis to one or more additional components of the UI control system 200, including the identification logic 208, the display logic 210 and the selection logic 212. Although the components of the control operations logic 202 are illustrated separately, the components may be combined or divided as suitable, and each may use one or more of the results generated by others in performing its own analysis. Data may be communicated between the components of the control operations logic 202 over a physical bus, a long-distance wired communication pathway, a short- or long-distance wireless communication pathway, or any combination of communication pathways. The UI control system 200 may include a memory 220. In some embodiments, the memory 220 may include a database or other data storage structure which may include memory structures for storing any of the data described herein used for UI control operations. The memory 220 may include any volatile or nonvolatile memory device, such as one or more hard drives, solid state logic, or portable storage media, for example.

The control operations logic 202 may include landmark logic 204, which may be configured to determine locations of one or more landmarks associated with a portion of a user's body. In some embodiments, the portion may include a user's hand. In some embodiments, the portion may include a user's hand and arm. In some embodiments, the portion may include two or more separate portions, such as a user's hand and a user's head, or a user's two hands.

The landmark logic 204 may be coupled with the input device 230, and may determine the landmark locations based on data provided by the input device 230. For example, in some embodiments, the input device 230 may include a depth camera as the image capture device 224, and the landmark logic 204 may perform any suitable image processing techniques to identify the location of landmarks based on the color and/or depth data included in one or more images of the user's body captured by the depth camera. In some embodiments, the image capture device 224 may include a conventional, non-depth camera, and the landmark logic 204 may perform image processing techniques to identify the location of landmarks in one or more images of the user's body captured by the non-depth camera. In some embodiments, the input device 230 may include a wearable sensor 226 which may provide data representative of the location of one or more landmarks (e.g., hand joints or portions of a user's fingers) to the landmark logic 204. In some embodiments, the landmark logic 204 may use data from multiple input devices included in the input device 230 to determine locations of one or more landmarks associated with a portion of the user's body.

Figure 3:
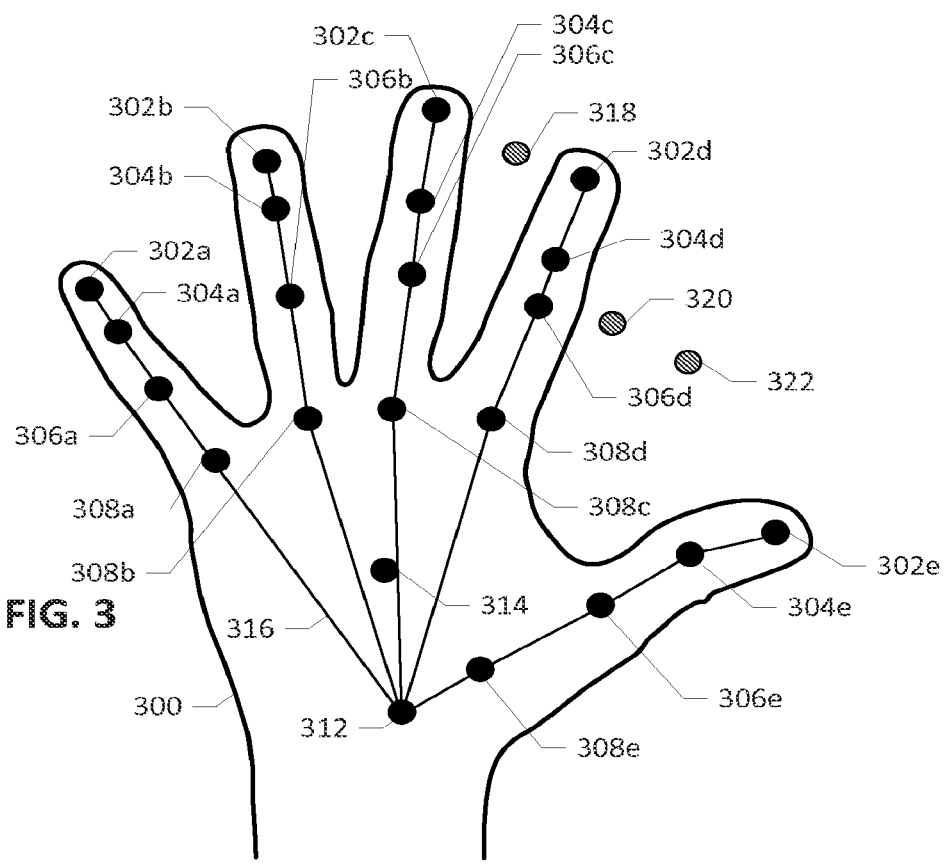
FIG. 3 illustrates multiple landmarks that may be identified on a portion of the user's body by the UI control system of FIG. 2, in accordance with various embodiments.

FIG. 3 depicts a portion 300 of a user's body and indicates multiple landmarks that may be identified by the landmark logic 204 on the portion 300, in accordance with various embodiments. The portion 300 illustrated in FIG. 3 is a user's hand, as may be captured by the image capture device 224, the wearable sensor 226, and/or other input devices 228. Several different types of landmarks are indicated in FIG. 3, including fingertip landmarks 302a-e, first finger joint landmarks 304a-e, second finger joint landmarks 306a-e, base joint landmarks 308a-e, a palm center landmark 314 and a hand base landmark 312. The landmark logic 204 may identify other landmarks of a user's hand (e.g., landmarks associated with edges of a user's hand in an image) and/or landmarks on other portions of a user's body. FIG. 3 also depicts structural lines 316, which may connect various landmarks identified by the landmark logic 204 to form a skeleton model of the portion 300 of the user's body. The landmark logic 204 may utilize such a model for tracking and landmark recognition purposes, in some embodiments, in accordance with known body modeling and tracking techniques.

FIG. 3 also depicts several auxiliary landmarks determined by the landmark logic 204 based on other landmarks. In particular, the auxiliary landmark 318 may be located at a point, such as the midpoint, on the line segment between the landmarks 302c (the tip of the middle finger) and 302d (the tip of the index finger). The auxiliary landmark 320 may be located at a point, such as the midpoint, on the line segment between the landmarks 302b (the tip of the ring finger) and 302e (the tip of the thumb). The auxiliary landmark 322 may be located at a point, such as the midpoint, on the line segment between the landmarks 102d (the tip of the index finger) and 302e (the tip of the thumb). The landmark logic 204 may be configured to generate any number and kind of desired auxiliary landmarks.

The landmark logic 204 may be configured to track the movements of a portion of the user's body, thereby dynamically identifying locations of landmarks of the portion of the user's body. The landmark logic 204 may be configured to perform any suitable technique for movement tracking, many accurate and robust examples of which are known in the art and are thus not discussed in detail herein. The tracking may be performed in real time. As discussed above, in some embodiments, the image capture device 224 may include a depth camera, which may provide both color and distance information for each pixel in a captured image (of the portion of the user's body) to the landmark logic 204. The landmark logic 204 may use the information provided by the depth camera to recognize and track landmark locations (e.g., by constructing a three-dimensional model of the landmark locations, among other techniques). For example, techniques in which a combination of depth data and amplitude data from a TOF camera may be used by the landmark logic 204 to identify a track portions of a user's body.

The control operations logic 202 may include pointer logic 206, which may be coupled to the landmark logic 204 and may be configured to determine a pointer based on the landmark locations determined by the landmark logic 204. The pointer logic 206 may be configured to determine a pointer in any of a number of ways, several of which are discussed in detail herein. In some embodiments, the pointer may be a multi-location pointer based on a plurality of landmark locations. In some embodiments, the pointer may be a base pointer based on a location of a lower portion of an index finger of a user's hand. In some embodiments, the pointer may be a virtual pointer based on a relative position of a landmark location with respect to a virtual interaction region. These and other embodiments are discussed in further detail below.

The control operations logic 202 may include identification logic 208, which may be coupled to the pointer logic 206 and may be configured to identify a UI element, from multiple UI elements, based on the pointer determined by the pointer logic 206. The identification logic 208 may be configured to identify a UI element in any of a number of ways, several of which are discussed in detail herein. For example, the identification logic 208 may identify multiple areas in the UI corresponding to respective ones of the multiple UI elements, and identify the UI element based on an amount of overlap between the area corresponding to the UI element and the pointer. In particular, in some embodiments, the identification logic 208 may identify the UI element with the greatest overlap with the pointer. In some embodiments, the technique used by the identification logic 208 to identify a UI element may depend on the technique used by the pointer logic 206 to determine the pointer. A number of embodiments of the identification logic 208 are discussed in further detail below.

The control operations logic 202 may include display logic 210, which may be coupled to the display 222 and may be configured to adjust the display 222 based on various UI control operations performed by the control operations logic 202. For example, the display logic 210 may be configured to visually indicate the pointer determined by the pointer logic 206 in the display 222. In some embodiments, the pointer may be visually indicated as a cursor, an arrow, an image of a hand or another visual indicator. When the portion of the user's body is moved, the visual indicator may move accordingly. In some embodiments, this visual indicator may have animation associated with it. For example, the visual indicator may be an icon representation of a human hand, with associated animation such that the hand appears to open and close, and this action may be mapped to the open and close actions of the user's hand. In some embodiments, a more direct representation of the portion of the user's body may be used. For example, when the image capture device 224 includes a depth camera, the depth pixels corresponding to the portion of the user's body may be extracted from the depth data stream, and overlaid on top of the UI display (e.g., the UI provided by the display 222). As a result, the user may receive direct and immediate feedback as to where the portion of his or her body (e.g., his or her hand) is positioned relative to the UI elements in the display and how it moves. The visual indicator may be a three-dimensional model of the user's hand, as computed by tracking techniques used by the landmark logic 204 and/or the selection logic 212. In some embodiments, no visual representation of the hand may be provided, but feedback may take the form of another visual or audible event, such as a highlight or animation that may be superimposed over an identified UI element or somewhere else in a display.

Thus, in some embodiments, the user may be presented with real-time feedback via the UI, during the interaction, to indicate how the UI control system 200 is interpreting his or her movements. In some embodiments, the display logic 210 may indicate the pointer by visually highlighting one or more UI elements, before they are selected by the user, to show how his or her movements are being interpreted by the UI control system 200. For example, in some embodiments, the display logic 210 may be configured to visually indicate, in the display 222, the UI element identified by the identification logic 208. In some embodiments, the UI element identified by the identification logic 208 may be visually indicated by enlarging the UI element in the UI while the element is identified. This may both provide a visual indication of the identification of the UI element to the user and may help avoid jitter in the UI when the pointer is close to a boundary of the UI element (and thereby susceptible to small movements that may identify and de-identify the UI element). Thus, even as a user's body undergoes small movements, a UI element may remain identified until the movement becomes significant enough that identification of another UI element is appropriate. When the UI element is no longer identified, the size of the UI element in the UI may be reduced to a nominal size. In some embodiments in which the pointer is a virtual pointer based on a relative position of a landmark location and a virtual interaction region, the display logic 210 may be configured to provide a visual representation of a distance between the landmark location and the visual interface surface. A number of embodiments of the display logic 210 are discussed in further detail below.

The control operations logic 202 may include selection logic 212, which may be coupled to the identification logic 208 and may be configured to select the UI element identified by the identification logic 208 based on gesture data indicative of a gesture of the user. As discussed above with reference to the landmark logic 204, the selection logic 212 may be coupled with the input device 230, and may identify a gesture of the user based on data provided by the input device 230. The gesture data analyzed by the selection logic 212 may include any of the kinds of data discussed above with reference to landmark location for the landmark logic 204. For example, in some embodiments, the input device 230 may include a depth camera as the image capture device 224, and the selection logic 212 may perform any suitable image processing techniques to identify user gestures based on the color and/or depth data included in one or more images of the user's body captured by the depth camera. A number of embodiments of the selection logic 212 are discussed in further detail below.

The UI control system 200 may include an output device 234. As discussed above with reference to the input device 230, although the output device 234 may be referred to in the singular, any number of output devices may be included in the output device 234. In some embodiments, the output device 234 may include a single output device (e.g., a single display). In some embodiments, the output device 234 may include a display 222 and other output devices 236. The display 222 may provide a visual representation of multiple UI elements with which the user may interact; these interactions may be processed in accordance with the UI control techniques described herein. The UI control system 200 may adjust the visual representation of the UI elements in the display 222 based on these user interactions. The display 222 may include one or more heads-up displays (i.e., displays including a projector arranged in an optical collimator configuration and a combiner to provide data without requiring a user to look away from his or her typical viewpoint), computer monitors, projectors, touchscreen displays, liquid crystal displays (LCDs), light-emitting diode displays or flat panel displays, for example. In some embodiments, the display 222 may be a three-dimensional display, and the UI control system 200 may perform the UI control techniques disclosed herein in three dimensions. The other output devices 236 may include one or more speakers or other audio transducers (which may be, for example, mounted in one or more earphones or earbuds), printers, projectors, wired or wireless transmitters for providing information to other devices, additional storage devices, or any suitable output device.

The components of the UI control system 200 may be distributed in any suitable combination between one or more of the components of the computing system 100 of FIG. 1. For example, the image capture device 224 and/or the wearable sensor 226 may be included in the wearable computing device 102, and the control operations logic 202 may be distributed between the personal computing device 104 and the remote computing device 106. In some embodiments, the image capture device 224, the control operations logic 202 and the display 222 may be included in the personal computing device 104.

A number of embodiments of the UI control system 200 are discussed in the following paragraphs. These embodiments may be implemented singly or jointly, and their features may be included in any combination in various implementations.

Figure 4:
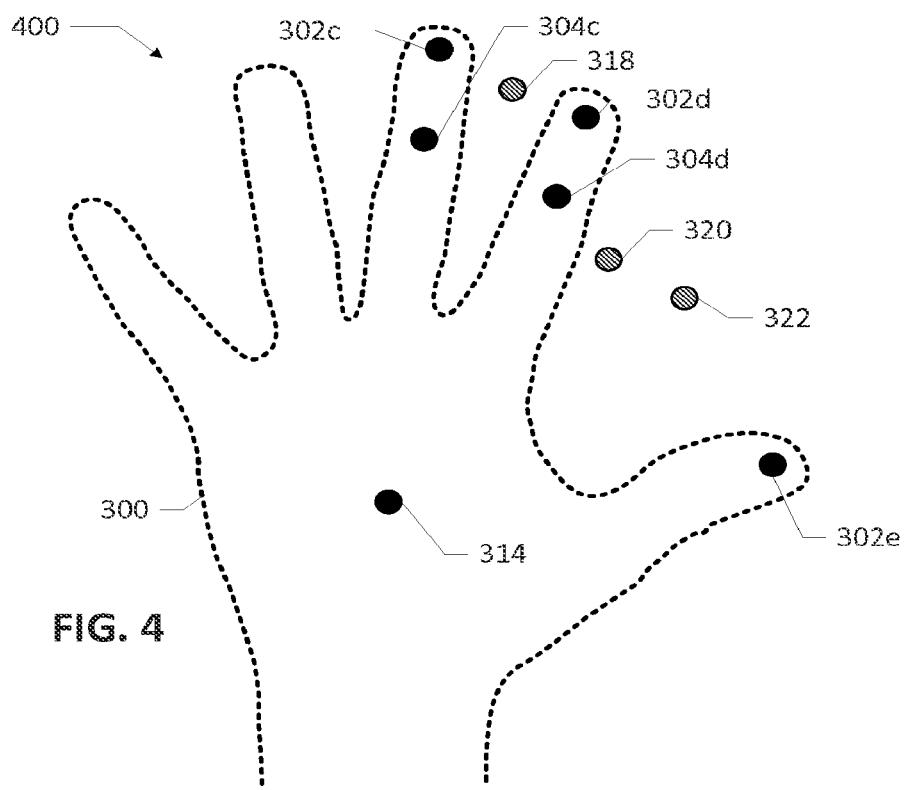
FIG. 4 illustrates a multi-location pointer, in accordance with various embodiments.

In some embodiments, the UI control system 200 may be configured to determine and utilize a multi-location pointer. In particular, the landmark logic 204 may be configured to determine locations of multiple landmarks associated with a portion of a user's body, and the pointer logic 206 may be configured to determine a multi-location pointer based on the multiple landmark locations. FIG. 4 illustrates a multi-location pointer 400 that includes the landmarks 302c, 304c, 302d, 304d, 302e, 314, 318, 320 and 322. The landmarks included in the multi-location pointer 400 are simply illustrative, and other combinations of multiple landmarks may be included in a multi-location pointer.

Figure 5:
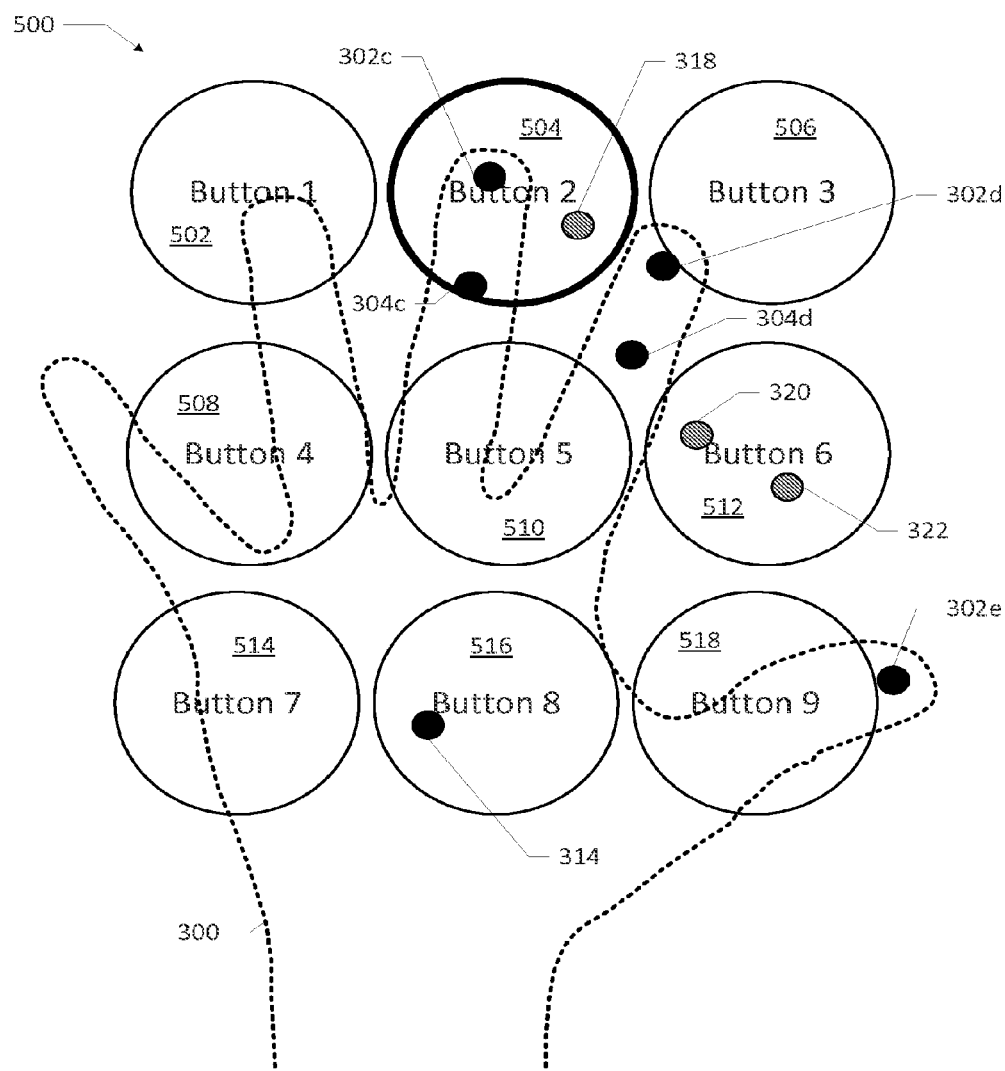
FIG. 5 illustrates a configuration in which the multi-location pointer of FIG. 4 is used to identify a UI element among multiple UI elements, in accordance with various embodiments.
Figure 6:
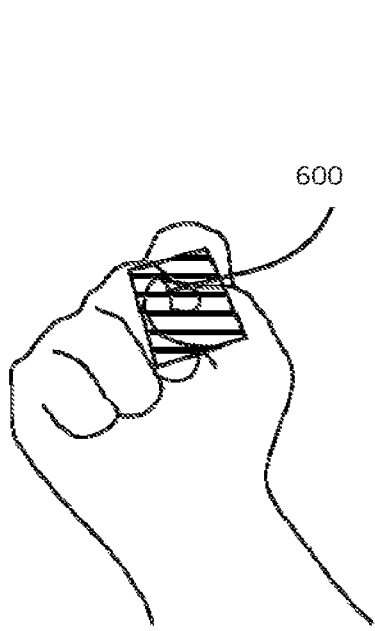
FIGS. 6-9 depict multi-location pointers, each of which includes an area whose boundaries are based on one or more landmark locations, in accordance with various embodiments.
Figure 7:
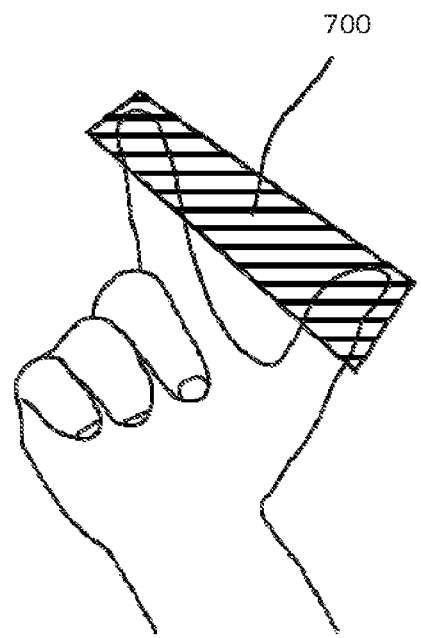
Figure 8:
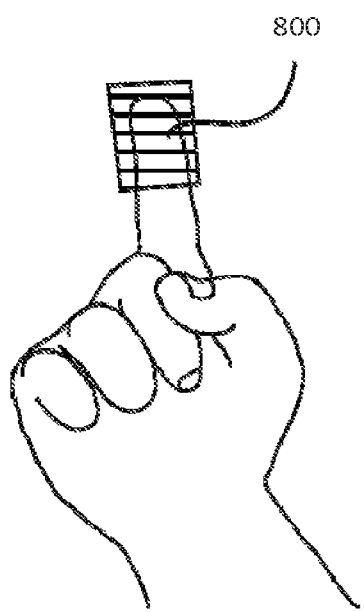
Figure 9:
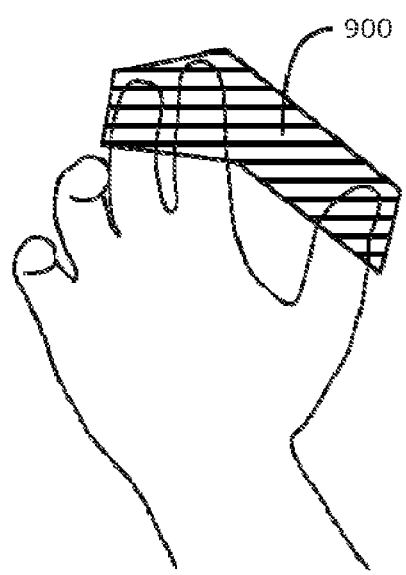

In embodiments in which the pointer logic 206 determines a multi-location pointer, the identification logic 208 may identify a UI element by determining a pointer score for each element in a UI and identifying the UI element that has the highest score. In some embodiments, the identification logic 208 may determine a pointer score by Identifying different areas in the UI corresponding to different UI elements and determining a pointer score based on an amount of overlap between the multi-location pointer in the areas corresponding to the different UI elements. As used herein, "overlap" may occur when a portion of the multi-location pointer falls within the area corresponding to a UI element. For example, FIG. 5 illustrates a configuration 500 in which the portion 300 of the user's body is positioned over multiple UI elements 502-518. Each of the UI elements 502-518 corresponds to an area (within the respective circle). As shown, various landmarks of the multi-location pointer 400 overlap with various areas corresponding to the different UI elements 502-518. In particular, the landmarks 302c, 304c and 318 overlap with the UI element 504, the landmarks 320 and 322 overlap with the UI element 512 and the landmark 314 overlaps with the UI. The landmarks 302d, 304d and 302e may not overlap with any of the UI elements 502-518.

In some embodiments, the pointer score for each UI element may be equal to the sum of the number of landmarks included in the multi-location pointer that overlap with the UI element. In the case of a tie, the identification logic 208 may be configured to give priority to certain kinds of landmarks (e.g., tip landmarks may be more important than palm landmarks or auxiliary landmarks). In the example of FIG. 5, since the UI element 504 overlaps with three landmarks of the multi-location pointer 400 (more than any other UI element), the identification logic 208 may identify the UI element 504. In FIG. 5, the UI element 504 is shown as highlighted, indicating its identification by the identification logic 208. In some embodiments, the UI element 504 may be visually indicated in a different way, such as being enlarged while identified.

In some embodiments, the pointer score for each UI element may be equal to a weighted sum of the number of landmarks included in the multi-location pointer that overlap with the UI element. Each landmark in the multi-location pointer may be associated with a weight, and this weight may be used to determine the contribution of that particular landmark to the pointer score of a UI element. For example, in the multi-location pointer 400, the landmark 302d may have a weight of 1.0, the landmark 302e may have a weight of 0.5, the landmark 302c may have a weight of 0.8, the landmark 304d may have a weight of 0.5, the landmark 304c may have a weight of 0.5, the landmark 314 may have a weight of 0.5, the landmark 318 may have a weight of 0.5, the landmark 320 may have a weight of 0.5 in the landmark 322 may have a weight of 0.5. In this example, the pointer score for the UI element 504 may be 1.8, the pointer score for the UI element 512 may be 1 and the pointer score for the UI element 516 may be 0.5. Thus, in this example, the identification logic 208 may identify the UI element 504. These weights may be assigned in any desired manner, and may be dynamically determined (e.g., using a learning algorithm) based on the types of hand motions that a user typically or preferably uses to interact with the computing system 100.

In some embodiments, a weight associated with a landmark in a multi-location pointer may change depending upon the distance between the landmark and a reference location on a portion of the user's body. In some embodiments, such a weight adjustment may be performed to reduce the influence of landmarks on the fingers when those fingers are closed onto the user's palm. In some such embodiments, therefore, the weights associated with each of the landmarks (as discussed above) may be nominal weights and may be reduced as the landmark approaches a reference location (e.g., a location at the center of the palm) until the weight is approximately 0 when the finger is fully folded. In some embodiments, the landmark logic 204 may calibrate an expected distance between various landmarks and a reference location (e.g., via an initial calibration procedure performed by having the user hold up his or her outstretched hand so that it can be measured by the input device 230), and the pointer logic 206 may adjust the weights based on the landmark locations determined by the landmark logic 204.

In some embodiments, a multi-location pointer may be determined by calculating a weighted average location based on the landmark locations discussed above and their corresponding weights. This weighted average location may represent a single point in a UI, which may correspond to a cursor that may be used to identify a UI element (e.g., when the cursor overlaps with the UI element). In some embodiments, the display logic 210 may provide a visual indicator of this weighted average location.

In some embodiments, a multi-location pointer may include an area, in addition to or instead of a collection of landmark locations. FIGS. 6-9 depict multi-location pointers 600-900, each of which includes an area whose boundaries are based on one or more landmark locations determined by the landmark logic 204. In particular, the multi-location pointer 600 may be based on the landmark 102e, the multi-location pointer 700 may be based on the landmarks 302e and 302d, the multi-location pointer 800 may be based on the landmark 302d, and the multi-location pointer 800 may be based on the landmarks 302c, 302d and 302e. The boundaries of the multi-location pointers 600-900 may be set to be a particular distance away from an identified landmark, and may include regions between multiple landmarks included in the multi-location pointer. A number of examples of multi-location pointers having various shapes are shown in FIGS. 6-9, but any other shape may be used (e.g., shapes having rounded corners, or non-contiguous shapes). In some embodiments, when the portion of the user's body includes the user's hand and one or more of the landmarks is associated with points on the user's fingers, a landmark located on a finger that is fully folded onto the palm may be ignored for the purposes of determining a pointer. In some embodiments, a landmark on a finger must be greater than a threshold distance away from a reference location (e.g., the center of the palm) in order for the landmark to be used in the determination of the pointer.

Figure 10:
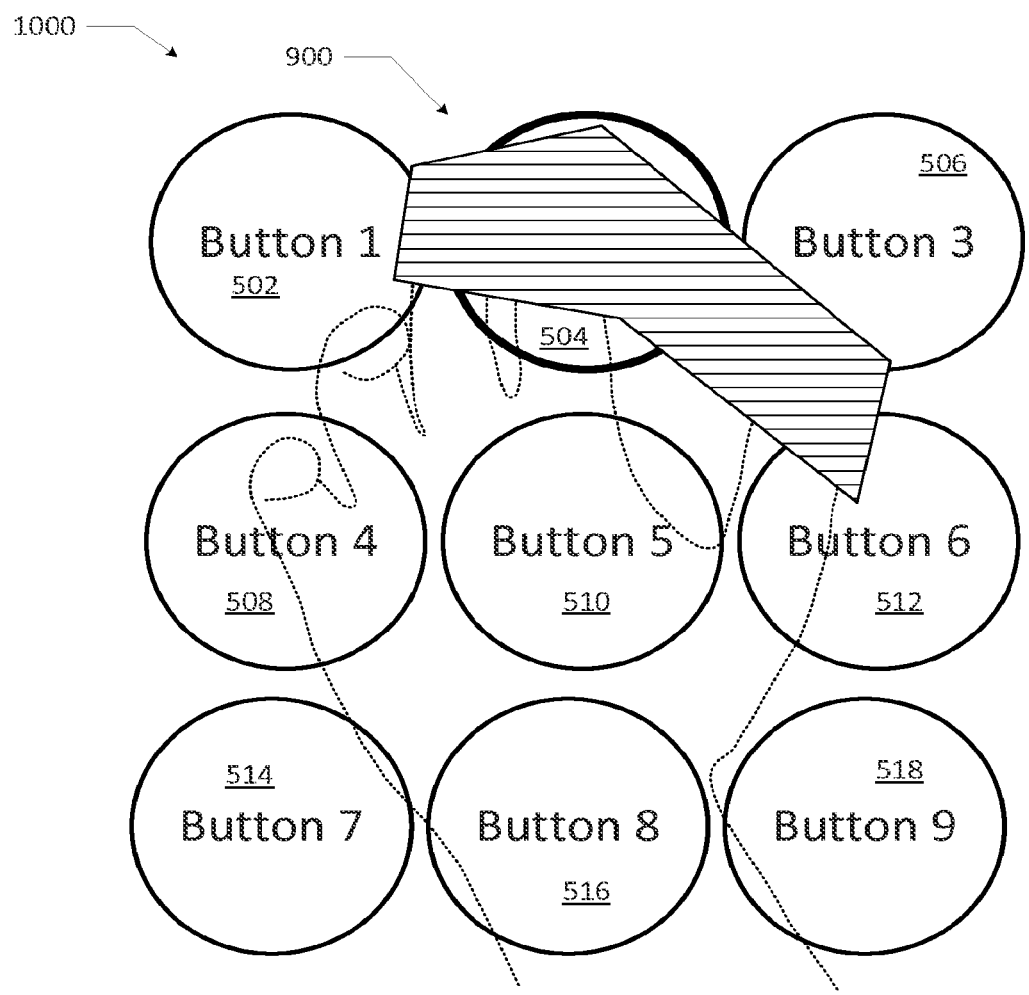
FIG. 10 illustrates a configuration in which the multi-location pointer of FIG. 9 is used to identify a UI element among multiple UI elements, in accordance with various embodiments.

In some embodiments in which a multi-location pointer includes an area, the identification logic 208 may be configured to determine a pointer score for different UI elements and identify a UI element that has the highest score, as discussed above with reference to FIG. 5. Any of the embodiments discussed above with reference to the multi-location pointer 400 may be applied to multi-location pointers including areas. For example, the identification logic 208 may be configured to determine a pointer score based on an amount of overlap (a "collision area") between the area of the multi-location pointer and the areas corresponding to various UI elements. These overlap areas may be measured in pixels or any other suitable units. For example, FIG. 10 illustrates a configuration 1000 in which the portion 300 of the user's body is positioned over multiple UI elements 502-518 and the multi-location pointer 900 overlaps with various areas corresponding to the different UI elements 502-518. In this example, the amount of overlap with the multi-location pointer 900 may be greatest for the UI element 504 (yielding the highest pointer score), and thus the identification logic 208 may identify the UI element 504.

Figure 11:
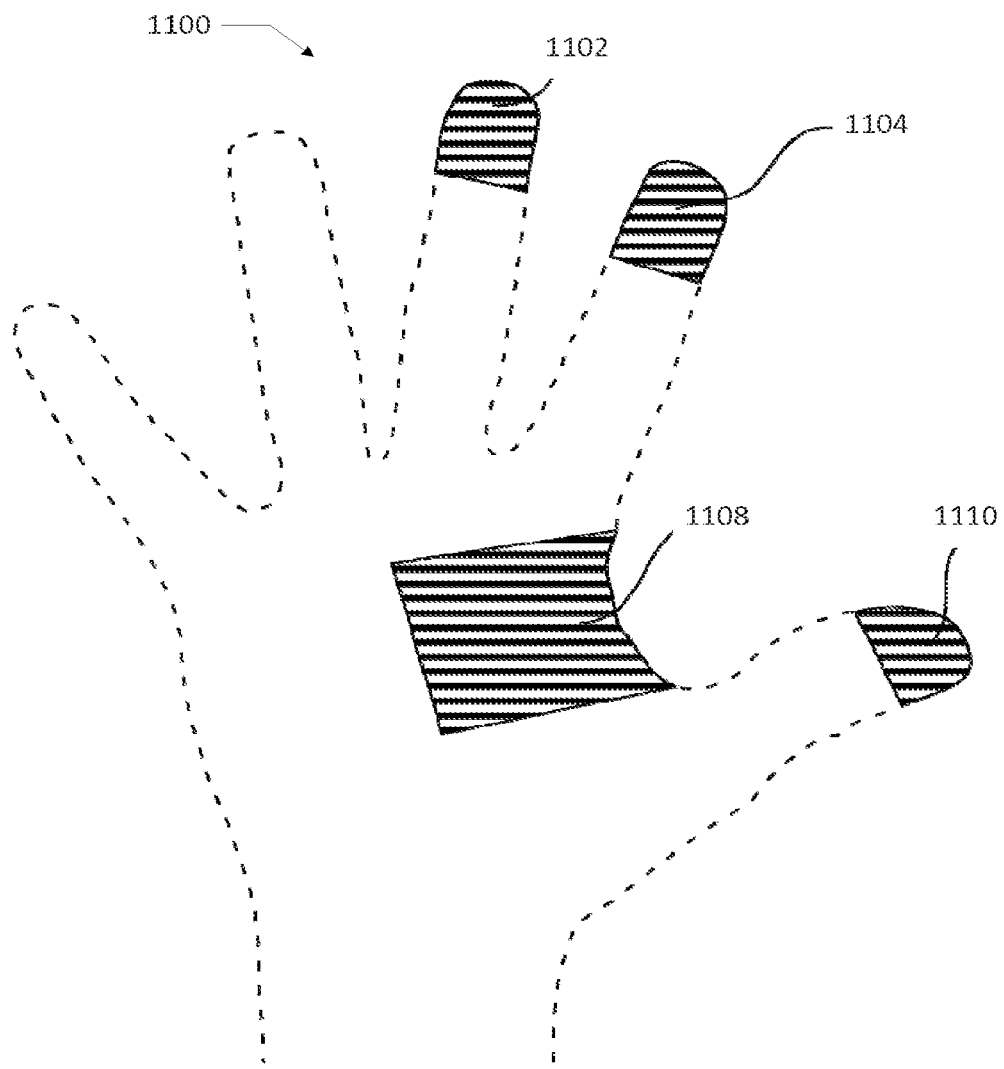
FIG. 11 illustrates a multi-location pointer that includes multiple areas, in accordance with various embodiments.

In some embodiments, a multi-location pointer may include multiple areas, each of which may be defined as areas of interest within an identified portion of the user's body. For example, the landmark logic 204 may be configured to isolate a user's hand or other body portion of interest (as an image "blob") from background objects in an image captured by the image capture device 224 (e.g., a depth image), determine the locations of landmarks within the isolated blob, and use the areas of the blob around the landmark locations as the areas of a multi-location pointer. FIG. 11 depicts a multi-location pointer 1100 having four areas 1102-1108, each of which corresponds to a portion of a hand blob around various landmarks of interest (the tips of the middle finger, index finger and thumb, and a portion of the hand between the center of the palm and the web between the index finger and thumb, respectively). The areas of the multi-location pointer 1100 may be collision areas, and pointer scores for different UI elements may be calculated as discussed above with reference to FIG. 10. Additionally, the different areas of the multi-location pointer 1100 may have weights, as discussed above with reference to the multi-location pointer 400. In some embodiments, these weights may be adjusted based on a distance between the areas and a reference location on the user's body, as discussed above. In some embodiments, when the portion of the user's body includes the user's hand and one or more of the areas is associated with points on the user's fingers, and area located on a finger that is fully folded onto the palm may be ignored for the purposes of determining a pointer. In some embodiments, an area on a finger must be greater than a threshold distance away from a reference location (e.g., the center of the palm) in order for the area to be used in the determination of the pointer.

Figure 12:
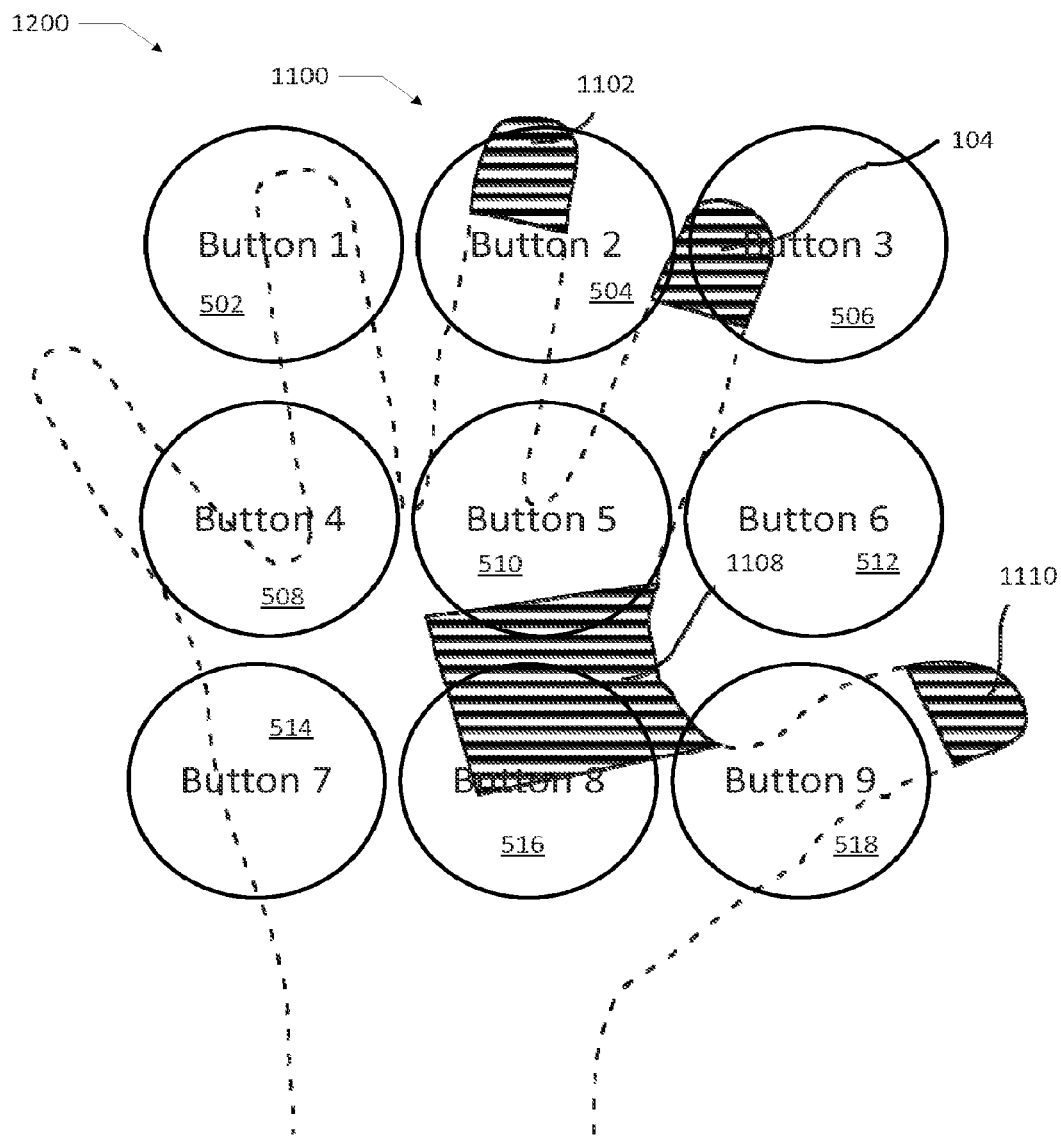
FIG. 12 illustrates a configuration in which the multi-location pointer of FIG. 11 is used to identify a UI element among multiple UI elements, in accordance with various embodiments.

For example, FIG. 12 illustrates a configuration 1200 in which the portion 300 of the user's body is positioned over multiple UI elements 502-518 and the multi-location pointer 1100 overlaps with various areas corresponding to the different UI elements 502-518. In this example, assuming all areas are weighted the same, the amount of overlap with the multi-location pointer 1100 may be greatest for the UI element 516 (yielding the highest pointer score), and thus the identification logic 208 may identify the UI element 516. If the different areas 1102-1108 are weighted differently within the multi-location pointer 1100, the UI element identified by the identification logic 208 may not be the UI element 516. For example, if the area 1104 is given a high enough weight, the UI element 506 may be identified by the identification logic 208.

In some embodiments, the UI control system 200 may be configured to determine and utilize a virtual pointer. In particular, the landmark logic 204 may be configured to determine a location of a landmark associated with a portion of the user's body, and the pointer logic 206 may be configured to determine a virtual pointer based on a relative position of the landmark location with respect to a virtual interaction region. As used herein, a "virtual interaction region" may refer to a plane, a curved surface, a volume (such as a sphere or rectangular solid) or another region spaced away from UI hardware of a computing system (e.g., a display or input device), which may be used as a reference for user interaction with a computing system. In some embodiments, a virtual interaction region may be a three-dimensional region in which UI elements are projected or otherwise displayed. In some embodiments, selection of a UI element may require that a portion of a user's body intersect with the virtual interaction region, but identification of UI elements may take place when the user's body is spaced away from the virtual interaction region (and may be indicated by a cursor or other visual indication technique).

Figure 13:
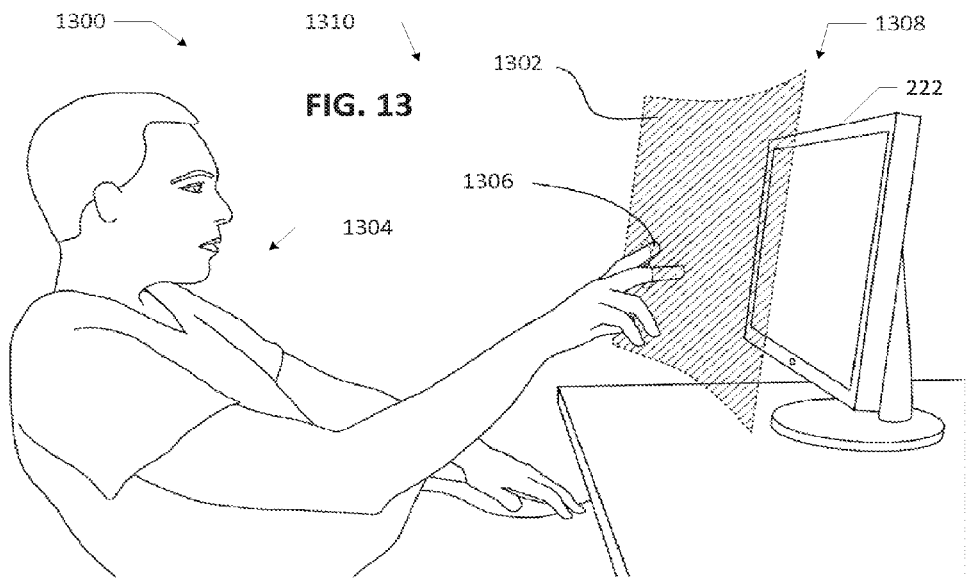
FIG. 13 depicts a configuration including a virtual interaction region 1302, in accordance with various embodiments.

For example, FIG. 13 depicts a configuration 1300 in which a virtual interaction region 1302 is shown. The virtual interaction region 1302 example of FIG. 13 is a concave curved surface spaced away from a display 222. A user may interact with a computing system that includes the display 222 (e.g., the computing system 100 of FIG. 1) by using his or her body and/or objects to interact with the virtual interaction region 1302. For example, in FIG. 13, a user 1304 is depicted as positioning his pointer and middle fingers 1306 so as to intersect with the virtual interaction region 1302, while other fingers are positioned near but do not intersect with the virtual interaction region 1302. The pointer logic 206 may determine the virtual pointer based on relative positions of landmarks on the user's body (e.g., landmarks on the index and middle fingers of the user 1304, and/or landmarks on the other fingers of the user 1304) and the virtual interaction region 1302. In some embodiments, the pointer logic 206 may determine the virtual pointer in accordance with any of the techniques described herein with reference to multi-location pointers, and may use a distance of various landmarks from the virtual interaction region to weight the contribution of any one or more landmarks to pointer scores for various UI elements (e.g., elements displayed on the display 222).

In some embodiments, the landmark used by the pointer logic 206 to determine the virtual pointer may vary as the portion of the user's body changes position with respect to the virtual interaction region. In particular, as a portion of the user's body intersects the virtual interaction region the landmark used to determine the virtual pointer may change to correspond to the point of intersection between the portion of the user's body and the virtual interaction region. For example, the landmark logic 204 may determine the location of the landmark on the portion of the user's body by determining a location of a first landmark proximate to a tip of a finger of the user's hand (e.g., any of the tip landmarks 302a-e) and determine a location of a second landmark proximate to a base joint of the finger of the user's hand (e.g., any of the base joint landmarks 308a-e). When the first landmark (proximate to the tip of the finger) is positioned on a first side of the virtual interaction region, the pointer logic 206 may determine the virtual pointer based on the relative position of the location of the first landmark with respect to the virtual interaction region. When the first landmark is positioned on a second side of the virtual interaction region, the pointer logic may determine the virtual pointer based on the relative position of the location of the second landmark (proximate to the base joint of the finger) with respect to the virtual interaction region.

In this manner, as the tip of the user's finger approaches the virtual interaction region, intersects with the virtual interaction region, and proceeds through the virtual interaction region to the opposite side, the landmark used by the pointer logic 206 to determine the virtual pointer may change accordingly, and may transition from the first landmark to the second landmark. In some embodiments, this transition may be discrete, in that the first landmark may be solely used to determine the virtual pointer when the first landmark is on the first side of the virtual interaction region and a second landmark may be solely used to determine the virtual pointer when the first landmark is on the second side of the virtual interaction region. In some embodiments, this transition may be substantially continuous, in that the landmark logic 204 may be configured to substantially continuously identify an auxiliary landmark between the first and second landmarks that correspond to the point of intersection between the finger and the virtual interaction region as the first landmark approaches the virtual interaction region from the first side and proceeds through the virtual interaction region to the second side, and the pointer logic 206 may be configured to determine the virtual pointer based on this auxiliary landmark. The reference to "finger" in the previous discussion is simply illustrative; the landmark logic 204 and the pointer logic 206 may be configured to use any portion of a user's body.

For example, in FIG. 13, a base joint of the middle finger of the user 1304 is depicted as positioned on a first side 1310 of the virtual interaction region 1302 (the side of the virtual interaction region 1302 facing the user 1304) while a tip of the middle finger of the user 1304 is depicted as positioned on a second side 1308 of the virtual interaction region 1302 (the side of the virtual interaction region 1302 facing the display 222). In the configuration 1300, the pointer logic 206 may be configured to determine a virtual pointer based on a landmark (e.g., an auxiliary landmark) located between a tip of the middle finger (positioned on the second side 1308 of the virtual interaction region 1302) and the base joint of the middle finger (positioned on the first side 1310 of the virtual interaction region 1302). If the hand of the user 1304 were wholly positioned on the first side 1310 of the virtual interaction region 1302, the pointer logic 206 may be configured to use a landmark proximate to the tip of the middle finger in determining the virtual pointer.

Figure 14A:
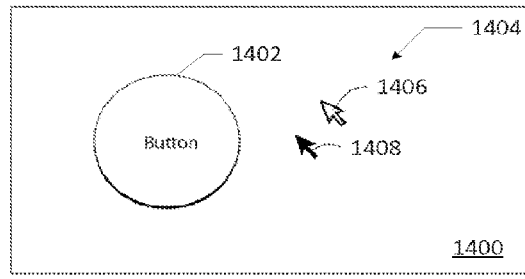
FIGS. 14A-B and 15A-B depict UI displays that include a dynamic visual indicator of a virtual pointer, in accordance with various embodiments.
Figure 14B:
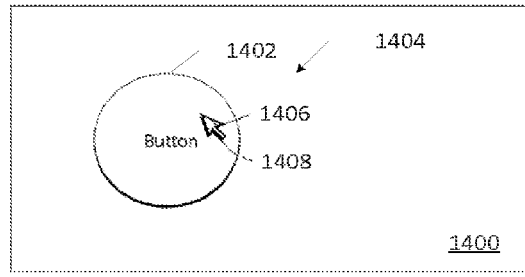

In some embodiments, the display logic 210 may be configured to provide a visual indicator of a distance between the landmark location identified by the landmark logic 204 and the virtual interaction region. This visual indicator may change as the distance changes, thereby providing feedback to the user as to his or her relative position with respect to the virtual interaction region. In some embodiments, the indicator may include a cursor displayed with a drop shadow that changes as the distance changes. For example, FIG. 14A depicts a UI display 1400 (e.g., provided by the display 222) that includes a UI element 1402 and a visual indicator 1404 of a virtual pointer. The visual indicator 1404 includes a cursor 1406 that indicates a location of the virtual pointer, and a drop shadow 1408 of the cursor 1406. The distance between the drop shadow 1408 and the cursor 1406 may change as the distance between the location of the landmark used for the virtual pointer (e.g., the tip of the user's index finger) and the virtual interaction region changes. For example, FIG. 14B depicts the UI display 1400 after the landmark used for the virtual pointer has moved closer to the virtual interaction region; as shown, the distance between the cursor 1406 and the drop shadow 1408 has decreased to reflect the decreased distance between the landmark and the virtual interaction region.

Figure 15A:
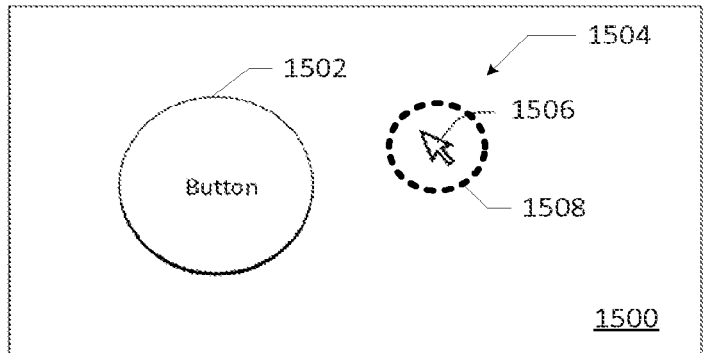
Figure 15B:
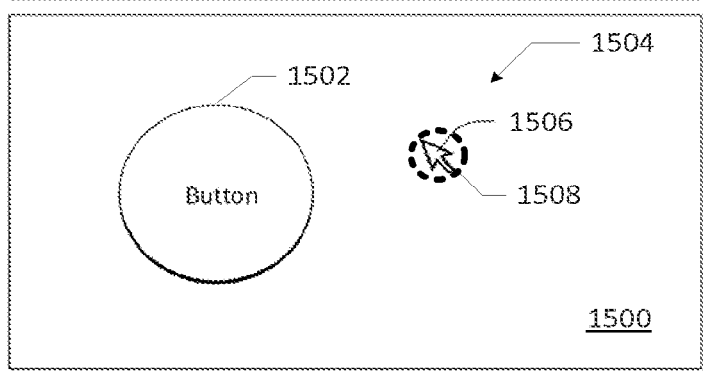

In some embodiments, a size of an indicator may change as the distance changes. For example, FIG. 15A depicts a UI display 1500 (e.g., provided by the display 222) that includes a UI element 1502 and a visual indicator 1504 of a virtual pointer. The visual indicator 1504 includes a cursor 1506 that indicates a location of the virtual pointer, and a circle 1508 around the cursor 1506. The diameter of the circle 1508 may change as the distance between the location of the landmark used for the virtual pointer (e.g., the tip of the user's index finger) and the virtual interaction region changes. For example, FIG. 15B depicts the UI display 1500 after the landmark used for the virtual pointer has moved closer to the virtual interaction region; as shown, the diameter of the circle 1508 has decreased to reflect the decreased distance between the landmark and the virtual interaction region.

The display logic 210 may implement any of a number of additional techniques, in addition to or instead of the techniques discussed above, to indicate a distance between the landmark location and the virtual interaction region. In some embodiments, a color of a cursor may change as the distance changes (e.g., a gradual transition from blue to red as the distance decreases, and vice versa). In some embodiments, one or more UI elements displayed on the display 222 may undergo visual changes to indicate the distance of the landmark location from the virtual interaction region (e.g., by indicating a UI element over which a user is currently "hovering" by rendering the UI element in shadow or otherwise changing its visual representation).

In some embodiments, the UI control system 200 may be configured to determine and utilize a base pointer. In particular, the landmark logic 204 may be configured to determine a location of a lower portion of an index finger of a user's hand, the lower portion spaced away from a tip of the index finger) and the pointer logic 206 may be configured to determine a base pointer based on the location of the lower portion of the index finger of the user's hand. In some embodiments, the lower portion of the index finger of the user's hand may be proximate to a base joint of the index finger on the user's hand (e.g., corresponding to the base joint landmark 308$d$ or an auxiliary landmark proximate to the base joint landmarks 308$d$). In some embodiments, the lower portion of the index finger of the user's hand may be between the base joint of the index finger (e.g., corresponding to the base joint landmarks 308$d$) and a second joint of the index finger on the user's hand (e.g., corresponding to the second joint landmark 306$d$).

Figure 16:
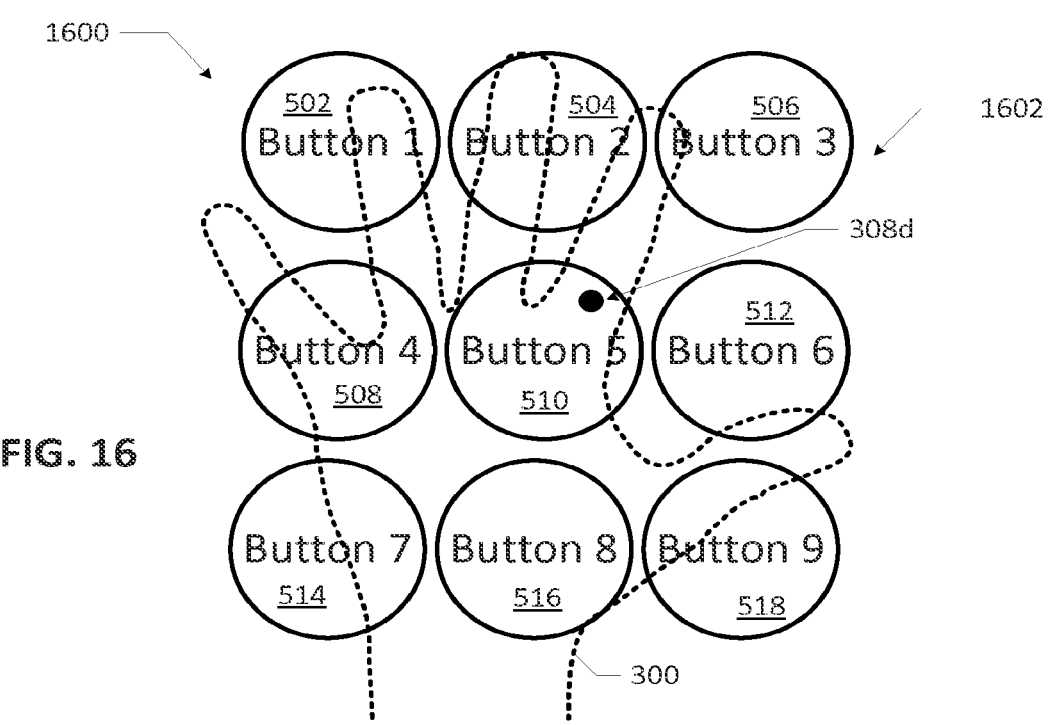
FIG. 16 illustrates a configuration in which a base pointer is used to identify a UI element among multiple UI elements, in accordance with various embodiments.

A base pointer generated by the pointer logic 206 based on this lower portion landmark may correspond to a single point in a UI, in much the same way that a mouse cursor corresponds to a single point in a UI. Consequently, the identification logic 208 be configured to identify a UI element based on an overlap between the base pointer the area corresponding to the UI element. For example, FIG. 16 illustrates a configuration 1600 in which the portion 300 of the user's body is positioned over multiple UI elements 502-518 and the base pointer 1602 (generated by the pointer logic 206 based on the location of the lower portion of the index finger, as indicated by the landmark 308$d$) overlaps with the area corresponding to the UI element 510. In this example, the identification logic 208 may identify the UI element 510. In some embodiments, the display logic 210 may be configured to display a cursor on the display 222 representative of the base pointer.

Any of the features of the embodiments described above may be combined in any desired manner. For example, the visual indicator techniques discussed above with reference to the virtual interaction region may be used to provide visual indicators of any of the pointers described herein. Multi-location pointers may be used with virtual interaction regions, and the landmarks used to determine the multi-location pointers may change as the relative position of various landmarks and the virtual interaction region changes.

Figures 17A, 17B:
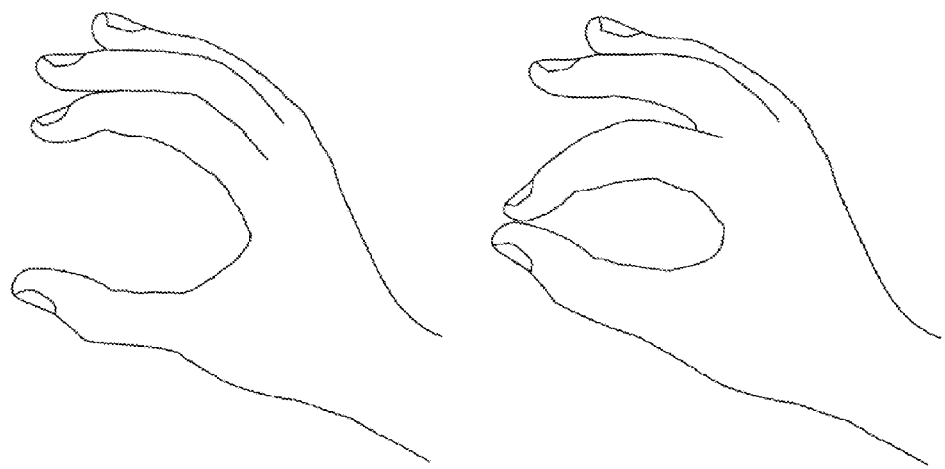
FIGS. 17A-B and 18A-B illustrate various gestures that may be recognized by the UI control system of FIG. 2 to select an identified UI element, in accordance with various embodiments.
Figures 18A, 18B:
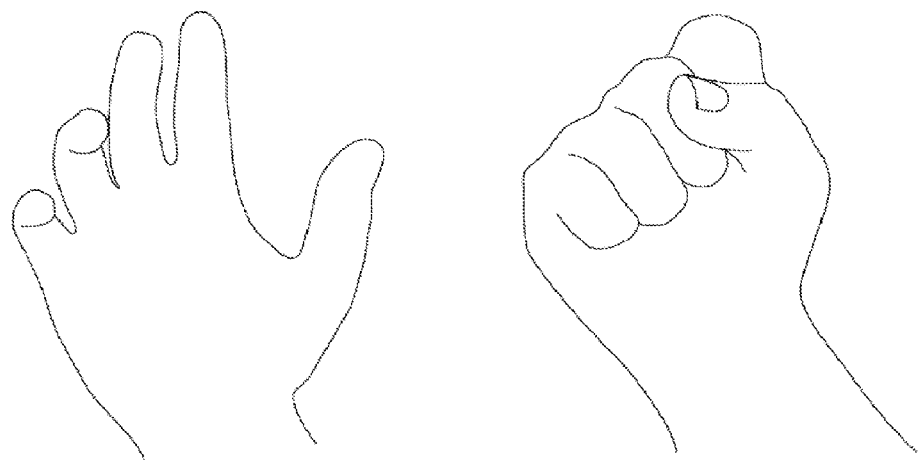

As noted above, the control operations logic 202 may include selection logic 212, which may be configured to select the UI element identified by the identification logic 208 based on gesture data indicative of a gesture of the user. A UI element may be identified by the identification logic 208 using any of the pointer techniques described above. FIGS. 17A-B and 18A-B illustrate various gestures that may be recognized by the selection logic 212 to select an identified UI element. In particular, FIGS. 17A-B illustrate a "pinch" gesture and FIGS. 18A-B illustrate a "grab" gesture, either or both of which may be recognized by the selection logic 212 to select an identified UI element. Upon receiving data from the input device 230 representing these gestures, the selection logic 212 may recognize the gestures and select the identified UI element.

Figure 19:
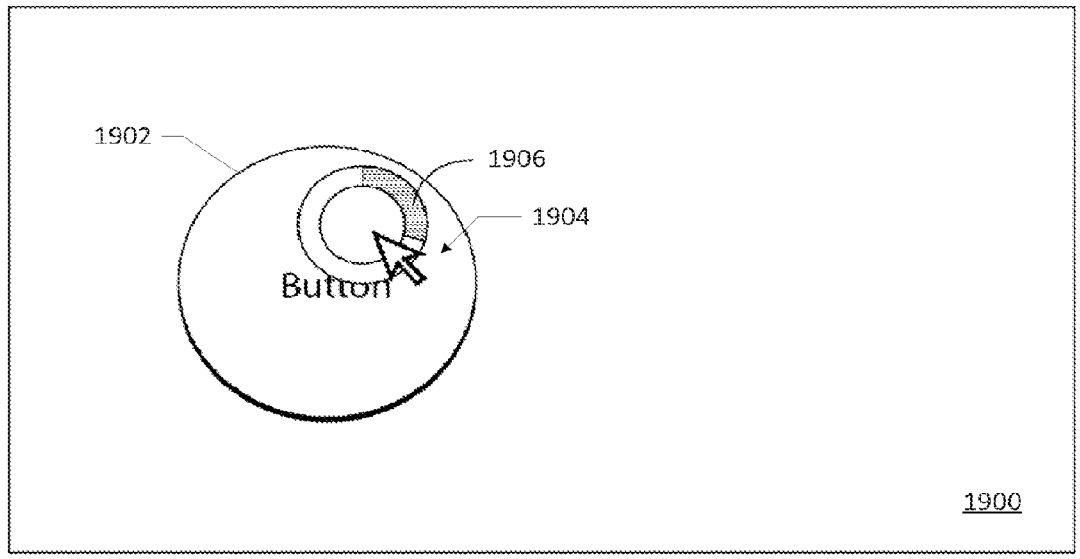
FIG. 19 depicts a UI display for selection of an identified UI element, in accordance with various embodiments.

In some embodiments, the selection logic 212 may be configured to recognize gesture data indicative of a portion of a user's body "hovering over" a UI element. The selection logic 212 may include a timer configured to track the amount of time over which the hover occurs. In some embodiments, upon the elapsing of a predetermined period of time, the selection logic 212 may select the UI element. In some embodiments, the display logic 210 may be configured to display a visual indicator of the elapsed time. For example, FIG. 19 depicts a UI display 1900 (e.g., provided by the display 222) that includes a UI element 1902, a visual indicator 1904 of a pointer, and a visual indicator 1906 of the hover time. The visual indicator 1906 of FIG. 19 may include a shaded portion whose extent around the edge of the visual indicator 1906 may increase as time progresses and which may completely encircle the visual indicator 1906 when the predetermined period of time has elapsed. In other embodiments, other visual indicators may be used.

Figure 20:
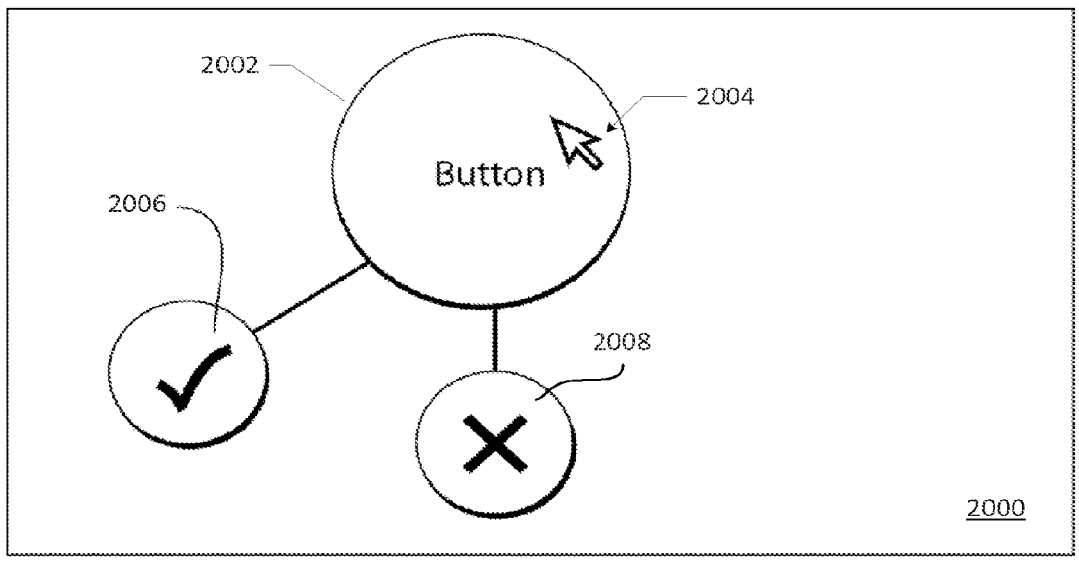
FIG. 20 depicts a UI display for selection of an identified UI element, in accordance with various embodiments.

In some embodiments, upon the elapsing of the predetermined period of time, the display logic 210 may display a confirmation UI element. The selection logic 212 may then await additional gesture data indicative of a selection of the confirmation UI element; upon detection of the additional gesture data, the selection logic 212 may select the UI element. For example, FIG. 20 depicts a UI display 2000 (e.g., provided by the display 222) that includes a UI element 2002, a visual indicator 2004 of a pointer, a confirmation UI element 2006, and a cancellation UI element 2008. The display logic 210 may be configured to display the confirmation UI element 2006 and the cancellation UI element 2008 upon the elapsing of a predetermined period of time after the user has begun to hover over the UI element 2002 (as suggested by the visual indicator 2004 being positioned over the UI element 2002). Subsequent to display of the confirmation UI element 2006 and the cancellation UI element 2008, a user may confirm the selection of the UI element 2002 by selecting the confirmation UI element 2006 (using any appropriate gesture recognized by the selection logic 212) or cancel the selection of the UI element 2002 by selecting the cancellation UI element 2008 (using any appropriate gesture). In some embodiments, the display logic 210 may display only a confirmation UI element and not a cancellation UI element. In some embodiments, the display logic 210 may display a cancellation UI element in addition to a visual indicator of the timer (e.g., the visual indicator 1906 of FIG. 19), selection of which may allow a user to stop progression of the timer.

The selection logic 212 may implement any of a number of other selection techniques instead of or in addition to those discussed above. For example, in embodiments which include a virtual interaction region, a user may select a UI element by moving his or her body so as to intersect with the virtual interaction region (e.g., by pushing one or more fingers "through" the virtual interaction region). Users may select UI elements using other modalities, such as voice commands, instead of or in addition to gestural techniques.

Various embodiments of the pointers disclosed herein may provide flexible and adaptive approaches to the challenges of gesture-based interface design. Traditionally, user interactions with computing devices, such as laptop computers, tablets, and mobile phones, requires physically manipulating controls, pressing buttons, or touching screens. For example, users may often interact with computing devices via input devices, such as a keyboard and mouse. While a keyboard and mouse may be satisfactory for functions such as entering text and scrolling through documents on a two-dimensional display, they may not be satisfactory for many other applications. For example, because a user's hand is typically constrained to move a mouse along flat, two-dimensional surfaces, navigating through three-dimensional virtual spaces with a mouse may be clumsy and non-intuitive. Many newer computing devices, such as tablets and mobile phones, may include a touchscreen interface; however, the conventional flat interface of a touchscreen may not allow a user or a computing device to communicate any notion of depth. These conventional devices often restrict the full range of possible hand and finger movements to a limited subset of two-dimensional movements that conform to the constraints of conventional technology. Various embodiments of the systems and techniques disclosed herein may enable people to communicate with their devices in a manner similar to the natural way in which they communicate with other people—namely, by gesturing with their bodies (e.g., by moving their hands and fingers in the air and pointing or nodding towards objects). Conventional user interface technologies do not enable such gesture-based interaction, and the ways in which people tend to move their hands and fingers do not readily map onto existing device interfaces (such as mouse or touchscreen interfaces).

Some embodiments of the systems and techniques disclosed herein may enable a user to quickly and accurately interact with a computing device by recognizing a broad range of behaviors (e.g., the movements of the user's hands and fingers) that translate to various intended interactions on the part of the user.

In a conventional user interface, such as a menu, a user may interact with UI elements, such as icons or text boxes displayed in a grid or a stack, by moving a pointer over the icon and clicking a button on a mouse or by touching the corresponding point on a touchscreen. In both of these examples, the user uses a single point of contact to select a UI element. Even in multi-touch devices (those in which a device is able to recognize two or more points of contact with the input surface), selection of a UI element typically occurs upon the first fingerlike contact with the element.

However, different users may use their hands, fingers and other body parts to refer to different UI elements in different ways, and thus there may be no single one-to-one mapping between hand configurations and movements and intended interactions with UI elements. Consequently, different UI applications may call for different and more complex tracking and gesture recognition techniques. Various ones of the techniques disclosed herein may address different challenges, and may be suitable in different applications.

For example, the multi-location pointers disclosed herein may be advantageous in various applications. Examples of some such advantages may be discussed with reference to the FIGS. 21-23, which illustrate three different ways in which a user may use his or her hand to indicate a UI element. If a UI were to rely solely on tracking and using the tip of the user's index finger as a pointer, the UI may fail to recognize these gestures and/or translate the gestures into the user's intended interactions. For example, in FIG. 21, a user may position a portion 300 of his or her body over a UI element 2102, intending to interact with the UI element 2102. Even though the user's index finger is not directly over the UI element 2102, the user might expect that his or her gesture would be effective. In FIG. 22, a grid of UI elements is displayed, and it is not apparent (based on the position of the body portion 300) with which UI element the user intends to interact. The user may expect the palm to act as the pointer, but may not be aware that the system is configured only to recognize the tip of an index finger. In FIG. 23, a user attempts to indicate the UI element 508 with a portion 300 of his or her body by "pinching" the UI element 2302 from either side. Since the user's index finger does not necessarily touch or overlap with the UI element 2302 in this gesture, this gesture may fail to be recognized by a system focused on the tip of the index finger, thereby frustrating the user.

Figure 21:
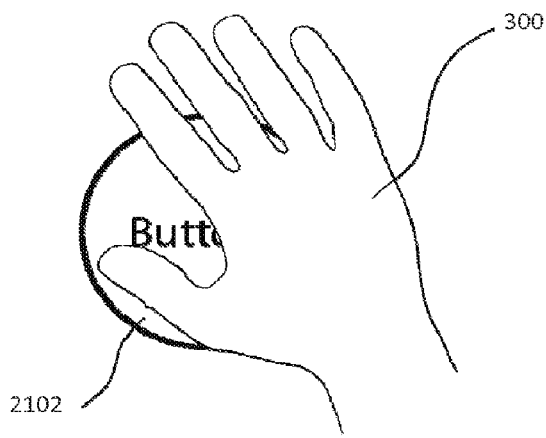
FIGS. 21-23 illustrate three different ways in which a user may use his or her hand to indicate a UI element, in accordance with various embodiments.
Figure 22:
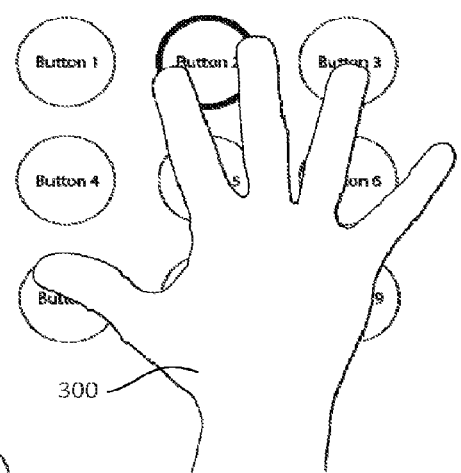
Figure 23:
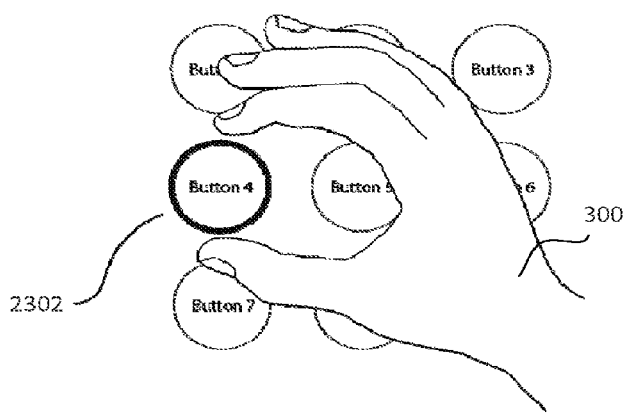

The examples illustrated in FIGS. 21-23 might appear at the same time in the same UI, rendering a pointer that is fixed on a single point such as the index finger or the center of the palm unsatisfactory. However, the use of a multi-location pointer, which may rely on multiple landmarks to determine a pointer as discussed above, may consider the contributions of multiple landmarks associated with a portion of a user's body in determining which UI element a user is most likely to intend to interact with, and thereby may achieve the user's intended purpose in a more robust and readily adoptable manner.

The virtual pointers disclosed herein may be advantageous in various applications. For example, in conventional "virtual touch screen" systems, an interaction area may be defined as a certain distance from a display or other device, and any object that enters the interaction area is interpreted as a pointer and may be tracked in order to map its movements onto UI elements. Such conventional systems are prone to false positives from unintended objects (such as the user's second hand, or face) entering the interaction area, causing frustration and discomfort for the user (who must artificially constrain his or her movements to avoid registering such false positives). The use of various ones of the virtual pointer embodiments disclosed herein may address these issues by focusing on one or more particular landmarks in determining a pointer (rather than interpreting any interference in the interaction area as a pointer) and may be particularly robust to variations in user behavior (e.g., by dynamically adjusting which landmarks are used to determine the pointer).

The base pointers disclosed herein may be advantageous in various applications. In particular, the base pointers disclosed herein may provide improvements over simply using the tip of the user's index finger, at least because such index finger-based approaches to determining a pointer may result in undesirable ambiguity in interpreting a user's intentions. For example, some systems may track the fingertip of the index finger as a pointer and may also rely on detection of a "pinch" gesture (as illustrated in FIGS. 17A-B) to select UI elements. These two different interactions may conflict with one another, since a movement of the index finger towards the thumb in order to perform the pinch gesture also results in moving the pointer that is mapped to the tip of the index finger. One alternative approach may be to rely on the palm center as a landmark for the pointer instead of the tip of the index finger. However, the center of the palm may yield a far less nuanced pointer than the tip of the index finger, and, moreover, may be less natural for the user. the base pointers disclosed herein may maintain the nuances of subtle palm movement (e.g., the motion involved in waving the hand around the wrist joint, a motion which may be substantially lost by tracking only the center of the palm) without creating a conflict with pinch gestures that rely on tracking the tip of the index finger.

FIGS. 24-29 are flow diagrams of illustrative processes for UI control, in accordance with various embodiments. While the operations of the processes of FIGS. 24-29 described herein are arranged in a particular order and illustrated once each, in various embodiments, one or more of the operations may be repeated, omitted or performed out of order. In particular, the operations of the processes of FIGS. 24-29, although illustrated as performed in a particular sequence for the sake of illustration, may be performed in parallel as suitable. Operations of the processes of FIGS. 24-29 may be described as performed by the UI control system 200, as embodied in the computing system 100, for illustrative purposes, but the operations of the processes of FIGS. 24-29, including individual operations of the processes of FIGS. 24-29, may be performed by any suitably configured computing device or collection of computing devices. Any of the operations of the processes of FIGS. 24-29 may be performed in accordance with any of the embodiments of the systems 100 and 200 described herein.

Figure 24:
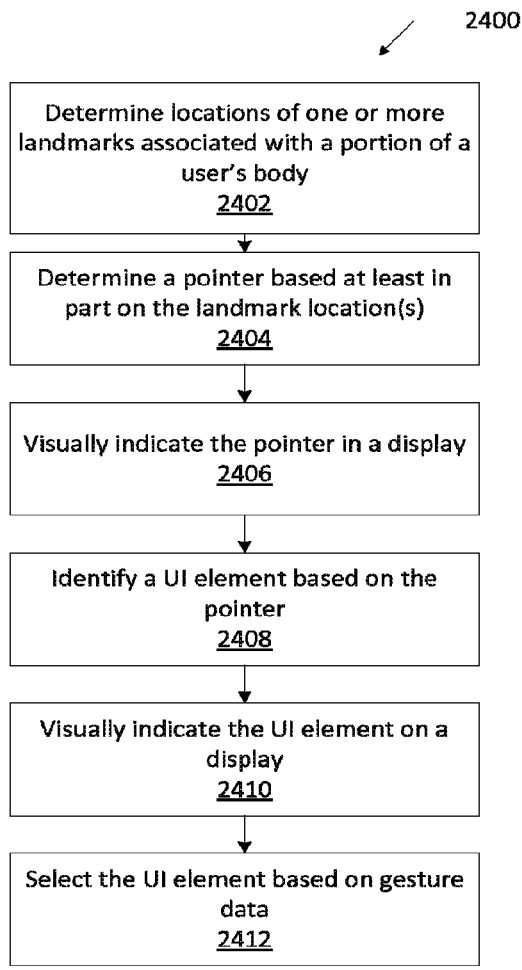

FIG. 24 is a flow diagram illustrating a process 2400 for UI control, in accordance with various embodiments. The process 2400 may begin at the operation 2402, in which the UI control system 200 (e.g., the landmark logic 204) may determine locations of one or more landmarks associated with a portion of a user's body. At the operation 2404, the UI control system 200 (e.g., the pointer logic 206) may determine a pointer based on the landmark location(s) determined at the operation 2402. At the operation 2406, the UI control system 200 (e.g., the display logic 210) may visually indicate the pointer (determined at the operation 2404) in a display (e.g., a display provided by the display 222). At the operation 2408, the UI control system 200 (e.g., the identification logic 208) may identify a UI element from among multiple UI elements in the display based on the pointer (determined at the operation 2406). At the operation 2410, the UI control system 200 (e.g., the display logic 210) may visually indicate the UI element (identified at the operation 2408) in the display. In some embodiments, the identified UI element may be visually indicated by enlarging the UI element in the display while the UI element is identified. At the operation 2412, the UI control system 200 (e.g., the selection logic 212) may select the UI element (identified at the operation 2408) based on gesture data indicative of a gesture of the user. The process 2400 may then end.

Figure 25:
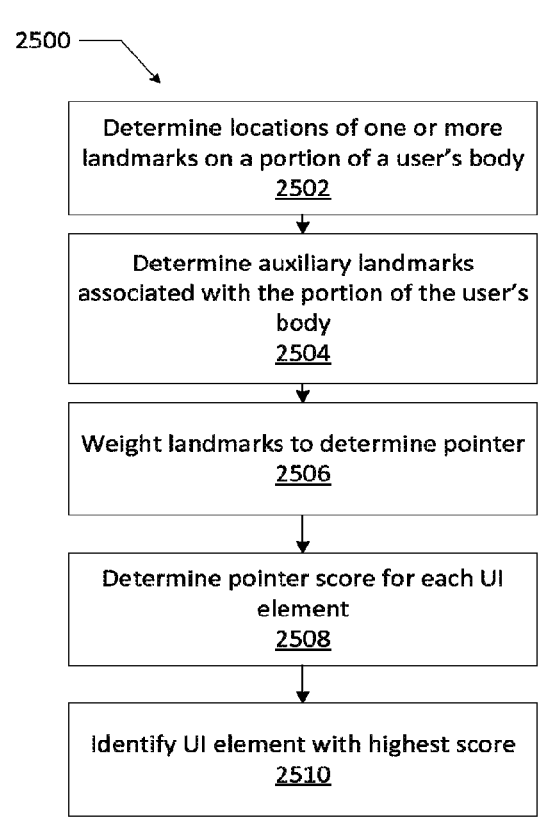

FIG. 25 is a flow diagram illustrating a process 2500 which may be implemented to perform the operations 2402-2408 of the process 2400 (FIG. 24), in accordance with various embodiments. The process 2500 may begin at the operation 2502, in which the UI control system 200 (e.g., the landmark logic 204) may determine locations of one or more landmarks on a portion of a user's body. Examples of such landmarks may include landmarks corresponding to various joints of a user's hand, features of a user's face, or any other desired landmark. At the operation 2504, the UI control system (e.g., the landmark logic 204) may determine locations of one or more auxiliary landmarks based on the landmarks identified at the operation 2502. Examples of auxiliary landmarks may include landmarks determined along line segments connecting two or more landmarks on a portion of the user's body, landmarks corresponding to centroid to various areas of the user's body, and any other suitable auxiliary landmarks. Upon the execution of the operations 2502 and 2504, the UI control system 200 may have identified multiple landmarks. At the operation 2506, the UI control system 200 (e.g., the pointer logic 206) may determine one or more weights associated with each of the landmarks identified at the operations 2502 and 2504. These landmarks and associated weights may form a multi-location pointer, in accordance with any of the embodiments discussed herein. At the operation 2508, the UI control system 200 (e.g., the identification logic 208) may determine a pointer score for each UI element in a UI. The pointer score may be based on overlap between the pointer and areas corresponding to the UI elements in the UI. A number of examples of pointer score techniques are disclosed herein. At the operation 2510, the UI control system 200 (e.g., the identification logic 208) may determine which UI element has the highest score, and identify that UI element. The process 2500 may then end.

FIG. 26 is a flow diagram illustrating an alternative process 2600 which may be implemented to perform the operations 2402-2408 of the process 2400 (FIG. 24), in accordance with various embodiments. The process 2600 may begin at the operation 2602, in which the UI control system 200 (e.g., the landmark logic 204) may determine locations of one or more landmarks on a portion of a user's body. Examples of such landmarks may include landmarks corresponding to various joints of a user's hand, features of a user's face, or any other desired landmark. In some embodiments, when the portion of the user's body includes the user's hand and one or more of the landmarks is associated with points on the user's fingers, a landmark located on a finger that is fully folded onto the palm may be ignored. In some embodiments, a landmark on a finger must be greater than a threshold distance away from a reference location (e.g., the center of the palm) in order for the landmark to be used in subsequent operations. At the operation 2604, the UI control system 200 (e.g., the pointer logic 206) may determine one or more areas of the portion of the user's body around one or more of the landmarks determined at the operation 2602. These areas may form a multi-location pointer, in accordance with any of the embodiments discussed herein. At the operation 2606, the UI control system 200 (e.g., the identification logic 208) may determine a pointer score for each UI element in a UI. The pointer score may be based on overlap between the pointer and areas corresponding to the UI elements in the UI (e.g., using a collision plane technique). At the operation 2608, the UI control system 200 (e.g., the identification logic 208) may determine which UI element has the highest score, and identify that UI element. The process 2600 may then end.

FIG. 27 is a flow diagram illustrating another alternative process 2700 which may be implemented to perform the operations 2402-2408 of the process 2400 (FIG. 24), in accordance with various embodiments. The process 2700 may begin at the operation 2702, in which the UI control system 200 (e.g., the landmark logic 204) may isolate a portion of a user's body within an image from background objects. At the operation 2704, the UI control system 200 (e.g., the landmark logic 204) may determine one or more areas of the isolated portion of the user's body. These areas may form a multi-location pointer, in accordance with any of the embodiments discussed herein. In some embodiments, when the portion of the user's body includes the user's hand and one or more of the areas is associated with points on the user's fingers; an area located on a finger that is fully folded onto the palm may be ignored. In some embodiments, an area on a finger must be greater than a threshold distance away from a reference location (e.g., the center of the palm) in order for the area to be used in subsequent operations. At the operation 2706, the UI control system 200 (e.g., the identification logic 208) may determine a pointer score for each UI element in a UI. The pointer score may be based on overlap between the pointer and areas corresponding to the UI elements in the UI (e.g., using a collision plane technique). At the operation 2708, the UI control system 200 (e.g., the identification logic 208) may determine which UI element has the highest score, and identify that UI element. The process 2700 may then end.

FIG. 28 is a flow diagram illustrating another alternative process 2800 which may be implemented to perform the operations 2402-2404 of the process 2400 (FIG. 24), in accordance with various embodiments. The process 2800 may begin at the operation 2802, in which the UI control system 200 (e.g., the landmark logic 204) may determine a location of a landmark associated with a portion of a user's body. The landmark determined at the operation 2802 may include any of the landmarks disclosed herein (including the landmarks discussed above with reference to the operations 2602 and 2604 of FIG. 26). At the operation 2804, the UI control system 200 (e.g., the pointer logic 206) may determine a pointer based on a relative position of the landmark location determined at the operation 2802 with respect to a virtual interaction region. This pointer may be a virtual pointer, in accordance with any of the embodiments discussed herein. The process 2800 may then end.

FIG. 29 is a flow diagram illustrating another alternative process 2900 which may be implemented to perform the operations 2402-2404 of the process 2400 (FIG. 24), in accordance with various embodiments. The process 2900 may begin at the operation 2902, in which the UI control system 200 (e.g., the landmark logic 204) may determine a location of a lower portion of an index finger of a user's hand. At the operation 2904, the UI control system 200 (e.g., the pointer logic 206) may determine a pointer based on the location of the lower portion of the index finger of the user's hand determined at the operation 2902. This pointer may be a base pointer, in accordance with any of the embodiments discussed herein. The process 2900 may then end.

The following paragraphs describe a number of examples of embodiments of the present disclosure. Example 1 is a UI control system, including: landmark logic to determine locations of a plurality of landmarks associated with a portion of a body of a user of a computing system; pointer logic, coupled with the landmark logic, to determine a pointer based at least in part on the plurality of landmark locations; and identification logic, coupled with the pointer logic, to identify a UI element from a plurality of UI elements of a UI of the computing system based at least in part on the pointer.

Example 2 includes the subject matter of Example 1, and further specifies that the landmark logic is to determine the locations of the plurality of landmarks on the portion of the user's body based on an image of the user's body captured by a depth camera.

Example 3 includes the subject matter of any of Examples 1-2, and further specifies that the portion of the user's body includes the user's hand.

Example 4 includes the subject matter of any of Examples 1-3, and further specifies that identify the UI element from the plurality of UI elements based on the pointer includes: identify a plurality of areas in the UI corresponding to respective ones of the plurality of UI elements; and identify the UI element based on an amount of overlap between the area corresponding to the UI element and the pointer.

Example 5 includes the subject matter of Example 4, and further specifies that the amount of overlap between the area corresponding to the UI element and the pointer is based on a weight of a landmark.

Example 6 includes the subject matter of Example 4, and further specifies that the weight is based on a distance between a location of the landmark and a reference location on the portion of the user's body.

Example 7 includes the subject matter of any of Examples 1-3, and further specifies that the pointer includes an area in the UI, and the area is based on a distance between a location of a landmark and a reference location on the portion of the user's body.

Example 8 includes the subject matter of any of Examples 1-7, and further includes display logic, coupled with the identification logic, to enlarge the UI element in a display in response to identification of the UI element.

Example 9 includes the subject matter of any of Examples 1-8, and further includes display logic, coupled with the pointer logic, to provide a visual indicator of the pointer in a display.

Example 10 includes the subject matter of any of Examples 1-9, and further includes selection logic, coupled with the identification logic, to select the UI element, subsequent to identification of the UI element, based on gesture data indicative of a gesture of the user.

Example 11 includes the subject matter of Example 10, and further includes display logic, coupled to the pointer logic, wherein: the gesture data indicative of the gesture of the user includes first gesture data indicative of a hover over the UI element for a predetermined period of time; the display logic is to display a confirmation UI element based on the first gesture data; the gesture data indicative of a user gesture includes second gesture data indicative of a selection of the confirmation UI element subsequent to display of the confirmation UI element; and the selection logic is to select the UI element based on the second gesture data.

Example 12 is a UI control system, including: landmark logic to determine a location of a lower portion of an index finger of a hand of a user of a computing system, the lower portion spaced away from a tip of the index finger; pointer logic, coupled with the landmark logic, to determine a pointer based at least in part on the location of the lower portion of the index finger of the user's hand; and identification logic, coupled with the pointer logic, to identify a UI element from a plurality of UI elements of a UI of the computing system based at least in part on the pointer.

Example 13 includes the subject matter of Example 12, and further specifies that the lower portion of the index finger of the user's hand is proximate to a base joint of the index finger of the user's hand.

Example 14 includes the subject matter of any of Examples 12-13, and further includes display logic, coupled with the pointer logic, to display a cursor on a display representative of the pointer.

Example 15 includes the subject matter of Example 14, and further specifies that the pointer corresponds to a single point in the UI.

Example 16 is a UI control system, including: landmark logic to determine a location of a landmark associated with a portion of a body of a user of a computing system; pointer logic, coupled with the landmark logic, to determine a pointer based at least in part on a relative position of the landmark location with respect to a virtual interaction region; and identification logic, coupled with the pointer logic, to identify a UI element from a plurality of UI elements of a UI of the computing system based at least in part on the pointer.

Example 17 includes the subject matter of Example 16 and further includes display logic, coupled with the pointer logic, to provide a visual indicator of a distance between the landmark location and the virtual interaction region, wherein the visual indicator changes as the distance changes.

Example 18 includes the subject matter of Example 17, and further specifies that the visual indicator has a size that increases as the distance increases.

Example 19 includes the subject matter of any of Examples 16-18, and further specifies that: determine the location of the landmark on the portion of the user's body includes determine a location of a first landmark proximate to a tip of an index finger of the user's hand and determine a location of a second landmark between the first landmark and a base joint of the index finger of the user's hand; the pointer logic is to determine the pointer based on a relative position of the location of the first landmark with respect to the virtual interaction region when the first landmark is positioned on a first side of the virtual interaction region; and the pointer logic is to determine the pointer based on a relative position of the location of the second landmark with respect to the virtual interaction region when the first landmark is positioned on a second side of the virtual interaction region different from the first side.

Example 20 is one or more computer readable media including computer readable instructions which, when executed by one or more processing devices of a computing system, cause the computing system to: determine locations of a plurality of landmarks associated with a portion of a body of a user of the computing system; determine a pointer based at least in part on the plurality of landmark locations; and identify a UI element from a plurality of UI elements of a UI of the computing system based at least in part on the pointer.

Example 21 includes the subject matter of Example 20, and further specifies that the locations of the plurality of landmarks on the portion of the user's body are determined based on an image of the user's body captured by a depth camera.

Example 22 includes the subject matter of any of Examples 20-21, further including computer readable instructions which, when executed by the one or more processing devices of the computing system, cause the computing system to enlarge the UI element in a display in response to identification of the UI element.

Example 23 includes the subject matter of any of Examples 20-22, further including computer readable instructions which, when executed by the one or more processing devices of the computing system, cause the computing system to provide a visual indicator of the pointer in a display.

Example 24 includes the subject matter of any of Examples 20-23, further including computer readable instructions which, when executed by the one or more processing devices of the computing system, cause the computing system to select the UI element, subsequent to identification of the UI element, based on gesture data indicative of a gesture of the user.

Example 25 includes the subject matter of Example 24, and further specifies that the gesture data indicative of the gesture of the user includes first gesture data indicative of a hover over the UI element for a predetermined period of time, and further includes computer readable instructions which, when executed by the one or more processing devices of the computing system, cause the computing system to: display a confirmation UI element based on the first gesture data; receive second gesture data indicative of a selection of the confirmation UI element subsequent to display of the confirmation UI element; and select the UI element based on the second gesture data.

Example 26 is a method for UI control, including: determining locations of a plurality of landmarks associated with a portion of a body of a user of a computing system; determining a pointer based at least in part on the plurality of landmark locations; and identifying a UI element from a plurality of UI elements of a UI of the computing system based at least in part on the pointer.

Example 27 includes the subject matter of Example 26, and further specifies that determining the locations of the plurality of landmarks on the portion of the user's body includes determining the locations of the plurality of landmarks on the portion of the user's body based on an image of the user's body captured by a depth camera.

Example 28 includes the subject matter of any of Examples 26-27, and further specifies that the portion of the user's body includes the user's hand.

Example 29 includes the subject matter of any of Examples 26-28, and further specifies that identifying the UI element from the plurality of UI elements based on the pointer includes: identifying a plurality of areas in the UI corresponding to respective ones of the plurality of UI elements; and identifying the UI element based on an amount of overlap between the area corresponding to the UI element and the pointer.

Example 30 includes the subject matter of Example 29, and further specifies that the amount of overlap between the area corresponding to the UI element and the pointer is based on a weight of a landmark.

Example 31 includes the subject matter of Example 29, and further specifies that the weight is based on a distance between a location of the landmark and a reference location on the portion of the user's body.

Example 32 includes the subject matter of any of Examples 26-28, and further specifies that the pointer includes an area in the UI, and the area is based on a distance between a location of a landmark and a reference location on the portion of the user's body.

Example 33 includes the subject matter of any of Examples 26-32, and further includes enlarging the UI element in a display in response to identification of the UI element.

Example 34 includes the subject matter of any of Examples 26-33, and further includes providing a visual indicator of the pointer in a display.

Example 35 includes the subject matter of any of Examples 26-24, and further includes selecting the UI element, subsequent to identification of the UI element, based on gesture data indicative of a gesture of the user.

Example 36 includes the subject matter of Example 35, and further specifies that the gesture data indicative of the gesture of the user includes first gesture data indicative of a hover over the UI element for a predetermined period of time and second gesture data indicative of a selection of the confirmation UI element subsequent to display of a confirmation UI element, and further include displaying the confirmation UI element based on the first gesture data; and selecting the UI element based on the second gesture data.

Example 37 is a method for UI control, including: determining a location of a lower portion of an index finger of a hand of a user of a computing system, the lower portion spaced away from a tip of the index finger; determining a pointer based at least in part on the location of the lower portion of the index finger of the user's hand; and identifying a UI element from a plurality of UI elements of a UI of the computing system based at least in part on the pointer.

Example 38 includes the subject matter of Example 37, and further specifies that the lower portion of the index finger of the user's hand is proximate to a base joint of the index finger of the user's hand.

Example 39 includes the subject matter of any of Examples 37-38, and further includes displaying a cursor on a display representative of the pointer.

Example 40 includes the subject matter of Example 39, and further specifies that the pointer corresponds to a single point in the UI.

Example 41 is a method for UI control, including: determining a location of a landmark associated with a portion of a body of a user of a computing system; determining a pointer based at least in part on a relative position of the landmark location with respect to a virtual interaction region; and identifying a UI element from a plurality of UI elements of a UI of the computing system based at least in part on the pointer.

Example 42 includes the subject matter of Example 41, and further includes providing a visual indicator of a distance between the landmark location and the virtual interaction region, wherein the visual indicator changes as the distance changes.

Example 43 includes the subject matter of Example 42, and further specifies that the visual indicator has a size that increases as the distance increases.

Example 44 includes the subject matter of any of Examples 41-43, and further specifies that: determining the location of the landmark on the portion of the user's body includes determining a location of a first landmark proximate to a tip of an index finger of the user's hand and determining a location of a second landmark between the first landmark and a base joint of the index finger of the user's hand; and determining the pointer based on the relative position of the landmark location with respect to the virtual interaction region includes determining the pointer based on a relative position of the location of the first landmark with respect to the virtual interaction region when the first landmark is positioned on a first side of the virtual interaction region and determining the pointer based on a relative position of the location of the second landmark with respect to the virtual interaction region when the first landmark is positioned on a second side of the virtual interaction region different from the first side.

Example 45 is one or more computer readable media including computer readable instructions which, when executed by a computing system, cause the computing system to perform the method of any of Examples 26-44.

Example 46 is a computing system for UI control, including means for performing the method of any of Examples 26-44.

Example 47 includes the subject matter of any of Examples 12-13 or 16-19, and further includes display logic, coupled with the pointer logic, to provide a visual indicator of the pointer in a display.

Example 48 includes the subject matter of any of Examples 37-38 or 41-44, and further includes providing a visual indicator of the pointer in a display.

Example 49 is a UI control system, including: means for determining locations of a plurality of landmarks associated with a portion of a body of a user of a computing system; means for determining a pointer based at least in part on the plurality of landmark locations; and means for identifying a UI element from a plurality of UI elements of a UI of the computing system based at least in part on the pointer.

Example 50 includes the subject matter of Example 49, and further specifies that the means for determining the locations of the plurality of landmarks on the portion of the user's body includes means for determining that the locations of the plurality of landmarks on the portion of the user's body based on an image of the user's body captured by a depth camera.

Example 51 includes the subject matter of any of Examples 49-50, and further specifies that the portion of the user's body includes the user's hand.

Example 52 includes the subject matter of any of Examples 49-51, and further specifies that the means for identifying the UI element from the plurality of UI elements based on the pointer includes: means for identifying a plurality of areas in the UI corresponding to respective ones of the plurality of UI elements; and means for identifying the UI element based on an amount of overlap between the area corresponding to the UI element and the pointer.

Example 53 includes the subject matter of Example 52, and further specifies that the amount of overlap between the area corresponding to the UI element and the pointer is based on a weight of a landmark.

Example 54 includes the subject matter of Example 52, and further specifies that the weight is based on a distance between a location of the landmark and a reference location on the portion of the user's body.

Example 55 includes the subject matter of any of Examples 49-51, and further specifies that the pointer includes an area in the UI, and the area is based on a distance between a location of a landmark and a reference location on the portion of the user's body.

Example 56 includes the subject matter of any of Examples 49-55, and further includes means for enlarging the UI element in a display in response to identification of the UI element.

Example 57 includes the subject matter of any of Examples 49-56, and further includes means for providing a visual indicator of the pointer in a display.

Example 58 includes the subject matter of any of Examples 49-57, and further includes means for selecting the UI element, subsequent to identification of the UI element, based on gesture data indicative of a gesture of the user.

Example 59 includes the subject matter of Example 58, and further specifies that the gesture data indicative of the gesture of the user includes first gesture data indicative of a hover over the UI element for a predetermined period of time and second gesture data indicative of a selection of the confirmation UI element subsequent to display of a confirmation UI element and further includes means for displaying the confirmation UI element based on the first gesture data; and selecting the UI element based on the second gesture data.

Example 60 is a UI control system, including: means for determining a location of a lower portion of an index finger of a hand of a user of a computing system, the lower portion spaced away from a tip of the index finger; means for determining a pointer based at least in part on the location of the lower portion of the index finger of the user's hand; and means for identifying a UI element from a plurality of UI elements of a UI of the computing system based at least in part on the pointer.

Example 61 includes the subject matter of Example 60, and further specifies that the lower portion of the index finger of the user's hand is proximate to a base joint of the index finger of the user's hand.

Example 62 includes the subject matter of any of Examples 60-61, and further includes means for displaying a cursor on a display representative of the pointer.

Example 63 includes the subject matter of Example 62, and further specifies that the pointer corresponds to a single point in the UI.

Example 64 is a UI control system, including: means for determining a location of a landmark associated with a portion of a body of a user of a computing system; means for determining a pointer based at least in part on a relative position of the landmark location with respect to a virtual interaction region; and means for identifying a UI element from a plurality of UI elements of a UI of the computing system based at least in part on the pointer.

Example 65 includes the subject matter of Example 64, and further includes means for providing a visual indicator of a distance between the landmark location and the virtual interaction region, wherein the visual indicator changes as the distance changes.

Example 66 includes the subject matter of Example 65, and further specifies that the visual indicator has a size that increases as the distance increases.

Example 67 includes the subject matter of any of Examples 64-66, and further specifies that: the means for determining the location of the landmark on the portion of the user's body includes means for determining a location of a first landmark proximate to a tip of an index finger of the user's hand and means for determining a location of a second landmark between the first landmark and a base joint of the index finger of the user's hand; and the means for determining the pointer based on the relative position of the landmark location with respect to the virtual interaction region includes means for determining the pointer based on a relative position of the location of the first landmark with respect to the virtual interaction region when the first landmark is positioned on a first side of the virtual interaction region and means for determining the pointer based on a relative position of the location of the second landmark with respect to the virtual interaction region when the first landmark is positioned on a second side of the virtual interaction region different from the first side.

Example 68 includes the subject matter of any of Examples 60-61 or 64-67, and further includes means for providing a visual indicator of the pointer in a display.

What is claimed is:

1. A user interface, UI, control system, comprising:
   one or more computer processors;
   an image capture device operated by the one or more computer processors to receive images of a portion of a body of a user of a computing system;
   a user interface (UI) control module to be operated by the one or more computer processors to implement:
   landmark logic to determine locations of a plurality of landmarks associated with the portion of the body of the user of the computing system;
   pointer logic, coupled with the landmark logic, to determine a pointer based at least in part on the plurality of landmark locations;
   identification logic, coupled with the pointer logic, to identify a UI element from a plurality of UI elements of a UI of the computing system, based at least in part on the pointer by:
   identification of a plurality of areas in the UI corresponding to respective ones of the plurality of UI elements; and
   identification of an amount of overlap between the area corresponding to the UI element and the pointer, wherein the amount of overlap is based upon a weighted sum of a number of landmarks included in the pointer that overlaps with the UI element; and
   display logic, coupled with the pointer logic, to provide a visual indicator of the identified UI element in a display of the computing system.

2. The UI control system of claim 1, wherein the image capture device includes a depth camera.

3. The UI control system of claim 1, wherein the portion of the user's body comprises the user's hand.

4. The UI control system of claim 1, wherein a weight of the weighted sum is based on a distance between a location of the landmark and a reference location on the portion of the user's body.

5. The UI control system of claim 1, wherein the pointer comprises an area in the UI, and the area is based on a distance between a location of a landmark and a reference location on the portion of the user's body.

6. The UI control system of claim 1, further comprising:
selection logic, coupled with the identification logic, to select the UI element, subsequent to identification of the UI element, based at least in part on gesture data indicative of a gesture of the user.

7. The UI control system of claim 6, further comprising display logic, coupled to the pointer logic, wherein:
the gesture data indicative of the gesture of the user includes first gesture data indicative of a hover over the UI element for a predetermined period of time;
the display logic is to display a confirmation UI element based on the first gesture data;
the gesture data indicative of a user gesture includes second gesture data indicative of a selection of the confirmation UI element subsequent to display of the confirmation UI element; and
the selection logic is to select the UI element based on the second gesture data.

8. A wearable computing device, comprising:
one or more computer processors;
a camera operated by the one or more computer processors to receive images of a portion of a body of a user of a computing system; and
a UI control module to be operated by the one or more computer processors to implement:
landmark logic to determine a location of a landmark associated with the portion of the body of the user of the computing system;
pointer logic, coupled with the landmark logic, to determine a pointer based at least in part on a relative position of the landmark location with respect to a virtual interaction region; and
identification logic, coupled with the pointer logic, to identify a UI element from a plurality of UI elements of a UI of the computing system, based at least in part on the pointer by:
identification of a plurality of areas in the UI corresponding to respective ones of the plurality of UI elements; and
identification of an amount of overlap between the area corresponding to the UI element and the pointer, wherein the amount of overlap is based upon a weighted sum of a number of landmarks included in the pointer that overlaps with the UI element.

9. The wearable computing device of claim 8, wherein the visual indicator is indicative of a distance between the landmark location and the virtual interaction region, and wherein the visual indicator changes as the distance changes.

10. The wearable computing device of claim 9, wherein the visual indicator has a size that increases as the distance increases.

11. The wearable computing device of claim 8, wherein:
the landmark logic is to determine a location of a landmark through determination of a location of a first landmark proximate to a tip of an index finger of the user's hand and determine a location of a second landmark between the first landmark and a base joint of the index finger of the user's hand;
the pointer logic is to determine the pointer based on a relative position of the location of the first landmark with respect to the virtual interaction region when the first landmark is positioned on a first side of the virtual interaction region; and
the pointer logic is to determine the pointer based on a relative position of the location of the second landmark with respect to the virtual interaction region when the first landmark is positioned on a second side of the virtual interaction region different from the first side.

12. One or more non-transitory computer readable media comprising computer readable instructions which, when executed by one or more processing devices of a computing system, cause the computing system to operate a user interface (UI) control module to:
receive data from one or more image capture devices of the computing system;
use the received data to determine locations of a plurality of landmarks associated with a portion of a body of a user of the computing system;
determine a pointer based at least in part on the plurality of landmark locations;
identify a UI element from a plurality of UI elements of a UI of the computing system, based at least in part on the pointer by:
identification of a plurality of areas in the UI corresponding to respective ones of the plurality of UI elements; and
identification of an amount of overlap between the area corresponding to the UI element and the pointer, wherein the amount of overlap is based upon a weighted sum of a number of landmarks included in the pointer that overlaps with the UI element; and
provide a visual indicator of the pointer in a display of the computing system.

13. The one or more non-transitory computer readable media of claim 12, wherein the one or more image capture devices includes a depth camera.

14. The one or more non-transitory computer readable media of claim 12, further comprising computer readable instructions which, when executed by the one or more processing devices of the computing system, cause the computing system to:
increase the size of the UI element in a display of the computing system, in response to identification of the UI element.

15. The one or more non-transitory computer readable media of claim 12, further comprising computer readable instructions which, when executed by the one or more processing devices of the computing system, cause the computing system to:
select the UI element, subsequent to identification of the UI element, based at least in part on gesture data indicative of a gesture of the user.

16. The one or more non-transitory computer readable media of claim 15, wherein the gesture data indicative of the gesture of the user includes first gesture data indicative of a hover over the UI element for a predetermined period of time, and further comprising computer readable instructions which, when executed by the one or more processing devices of the computing system, cause the computing system to:
display a confirmation UI element based on the first gesture data;
receive second gesture data indicative of a selection of the confirmation UI element subsequent to display of the confirmation UI element; and
select the UI element based on the second gesture data.

17. The one or more non-transitory computer readable media of claim 12, wherein a weight of the weighted sum is based on a distance between a location of the landmark and a reference location on the portion of the user's body.

* * * * *